United States Patent
Nagae et al.

(10) Patent No.: US 10,661,768 B2
(45) Date of Patent: May 26, 2020

(54) LANE DEPARTURE PREVENTION APPARATUS

(71) Applicants: Akira Nagae, Susono (JP); Kumiko Kondo, Numazu (JP); Hironori Ito, Susono (JP); Tomoyuki Doi, Gotemba (JP); Ryo Inomata, Ashigarakami (JP); Masayuki Ikeda, Susono (JP); Toshifumi Sugisawa, Yokohama (JP)

(72) Inventors: Akira Nagae, Susono (JP); Kumiko Kondo, Numazu (JP); Hironori Ito, Susono (JP); Tomoyuki Doi, Gotemba (JP); Ryo Inomata, Ashigarakami (JP); Masayuki Ikeda, Susono (JP); Toshifumi Sugisawa, Yokohama (JP)

(73) Assignees: TOYOTA JIDOSHA KABUSHIKI KAISHA, Toyota-shi, Aichi-ken (JP); ROBERT BOSCH GMBH, Stuttgart (DE)

( * ) Notice: Subject to any disclaimer, the term of this patent is extended or adjusted under 35 U.S.C. 154(b) by 275 days.

(21) Appl. No.: 15/671,302

(22) Filed: Aug. 8, 2017

(65) Prior Publication Data
US 2018/0043870 A1    Feb. 15, 2018

(30) Foreign Application Priority Data
Aug. 15, 2016    (JP) .................. 2016-159254

(51) Int. Cl.
*B60T 8/1755*    (2006.01)
*B60T 8/1761*    (2006.01)
(Continued)

(52) U.S. Cl.
CPC ........ *B60T 8/17557* (2013.01); *B60T 8/1761* (2013.01); *B60W 30/12* (2013.01); *B62D 6/003* (2013.01); *B60T 2201/083* (2013.01)

(58) Field of Classification Search
CPC ............... B60T 8/17557; B60T 8/1761; B60T 2201/083; B60W 30/12; B62D 6/003
(Continued)

(56) References Cited

U.S. PATENT DOCUMENTS 7,206,684 B2    4/2007    Takeda
2006/0142921 A1    6/2006    Takeda

FOREIGN PATENT DOCUMENTS

EP    2939889 A1 *    11/2015    .......... B60T 8/17552
JP    06016119 A    1/1994
(Continued)

*Primary Examiner* — Anthony R Jimenez
(74) *Attorney, Agent, or Firm* — Sughrue Mion, PLLC

(57) ABSTRACT

A lane departure prevention apparatus (17) has: a controlling device (172) configured to control a braking device (122) so that prevention yaw moment for preventing a vehicle from departing from a driving lane; and determining device (173) configured to determine whether or not slip ratio of a front wheel is larger than a first threshold value (KSfr) and whether or not slip ratio of a rear wheel is larger than a second threshold value (KSrr), the controlling device is configured to control the braking device so that the braking force applied from the braking device becomes smaller than the braking force for applying the prevention yaw moment, if it is determined that the slip ratio of the front wheel is larger than the first threshold value and/or the slip ratio of the rear wheel is larger than the second threshold value.

5 Claims, 11 Drawing Sheets

(51) Int. Cl.
*B60W 30/12* (2020.01)
*B62D 6/00* (2006.01)

(58) Field of Classification Search
USPC .......................................................... 701/41
See application file for complete search history.

(56) References Cited

FOREIGN PATENT DOCUMENTS

| | | | |
|---|---|---|---|
| JP | 2001-310719 A | 11/2001 |
| JP | 2004284485 A | 10/2004 |
| JP | 2006-206032 A | 8/2006 |
| JP | 3826758 B2 | 9/2006 |

\* cited by examiner

LANE DEPARTURE PREVENTION APPARATUS

TECHNICAL FIELD

The present invention relates to a technical field of a lane departure prevention apparatus that is configured to prevent a vehicle from departing from a driving lane on which the vehicle is currently traveling.

BACKGROUND ART

A lane departure prevention apparatus disclosed in a Patent Literature 1 to a Patent Literature 3 is known as one example of a lane departure apparatus. The lane departure prevention apparatus disclosed in the Patent Literature 1 to the Patent Literature 3 is configured to apply, to a vehicle, yaw moment for preventing the vehicle from departing from a driving lane by controlling a braking force applied to a wheel (i.e. a tire), if there is a possibility that the vehicle departs from the driving lane.

CITATION LIST

Patent Literature

[Patent Literature 1] Japanese Unexamined Patent Application Publication No. 2001-310719
[Patent Literature 2] Japanese Patent No. 3826758
[Patent Literature 3] Japanese Unexamined Patent Application Publication No. 2006-206032

SUMMARY OF INVENTION

Technical Problem

Depending on a driving condition of the vehicle when the braking force for preventing the departure from the driving lane is applied, undesired yaw rate (namely, yaw rate that is different from desired yaw rate that should occur when the yaw moment for preventing the departure of the vehicle is applied) may occur in the vehicle due to applying the braking force. There is a possibility that this undesired yaw rate occurs even when the vehicle travels on any driving lane, however, there is a relatively high possibility that this undesired yaw rate occurs when friction coefficient of the driving lane (namely, friction coefficient of a road surface) is relatively small or the driving lane is a turning road. Namely, there is a relatively high possibility that this undesired yaw rate occurs when slip ratio of the wheel becomes so large that desired grip force cannot be ensured.

The decrease of the grip force of the wheel caused by the increase of the slip ratio of the wheel may result in this undesired yaw rate, and behavior of the vehicle may be unstable if any countermeasure is not adopted. Thus, as one example of the countermeasure, there is a method of stopping applying the braking force (alternatively, a method of decreasing the applied braking force) if the slip ratio of the wheel is equal to or larger than a predetermined ratio when the braking force for preventing the departure from the driving lane is applied, in order to prevent the unstable behavior of the vehicle. As a result, the increase of the slip ratio of the wheel is prevented, compared to the case where the braking force is kept to be applied (alternatively, the applied braking force is not decreased) even if the slip ratio of the wheel is equal to or larger than the predetermined ratio. Thus, the decrease of the grip force of the wheel is also prevented, and as a result, the behavior of the vehicle is stable.

By the way, if the behavior of the vehicle is unstable, there is a possibility that the wheel skids on the road. In this case, the front wheel may skid firstly before the rear wheel skids or the rear wheel may skid firstly before the front wheel skids. Considering characteristics of the behavior of the vehicle (in other word, driving performance of the vehicle), the behavior of the vehicle when the rear wheel skids firstly before the front wheel skids is more unstable than the behavior of the vehicle when the front wheel skids firstly before the rear wheel skids. Therefore, in order to effectively prevent the unstable behavior of the vehicle, it is preferable to prevent the rear wheel from skidding firstly more preferentially than preventing the front wheel from skidding firstly.

The above described technical problem is one example of the technical problem to be solved by the present invention. It is therefore an object of the present invention to provide, for example, a lane departure prevention apparatus that is configured to apply, to the wheel, the braking force for preventing the vehicle from departing from the driving lane while preventing the unstable behavior of the vehicle by preferentially preventing the rear wheel from skidding firstly before the front wheel skids.

Solution to Problem

<1>

One aspect of a lane departure prevention apparatus has: a controlling device that is configured to calculate prevention yaw moment that is capable of preventing a vehicle from departing from a driving lane on which the vehicle is currently traveling and to control a braking device that is configured to apply braking force to wheels so that the calculated prevention yaw moment is applied to the vehicle, if there is a possibility that the vehicle departs from the driving lane; and a determining device that is configured to determine whether or not a slip ratio of a front wheel among the wheels is larger than a first threshold value and whether or not a slip ratio of a rear wheel among the wheels is larger than a second threshold value that is smaller than the first threshold value, if the prevention yaw moment is applied, the controlling device is configured to control the braking device so that the braking force applied from the braking device becomes smaller than the braking force that is capable of applying the calculated prevention yaw moment, if it is determined that the slip ratio of the front wheel is larger than the first threshold value and/or it is determined that the slip ratio of the rear wheel is larger than the second threshold value.

According to one aspect of the lane departure prevention apparatus, the braking force that is applied under the control of the controlling device becomes smaller than the braking force that is capable of applying the prevention yaw moment, if it is determined that the slip ratio of the front wheel is larger than the first threshold value and/or it is determined that the slip ratio of the rear wheel is larger than the second threshold value. If the braking force decreases, increase of the slip ratio of at least one of the front wheel and the rear wheel is prevented, and thus, grip force of the vehicle can be ensured. Therefore, unstable behavior of the vehicle that is caused by applying the braking force can be prevented.

Moreover, since the second threshold value is smaller than the first threshold value, the increase of the slip ratio of the rear wheel is prevented more preferentially than the increase of the slip ratio of the front wheel. Thus, the decrease of the grip force of the rear wheel is prevented more preferentially than the decrease of the grip force of the front wheel. Namely, it is possible to preferentially prevent the rear wheel from skidding firstly before the front wheel skids. Thus, one aspect of the lane departure prevention apparatus is capable of applying, to the wheel, the braking force for preventing the vehicle from departing from the driving lane while preventing the unstable behavior of the vehicle more effectively by preferentially preventing the rear wheel from skidding firstly before the front wheel skids.

<2>

In another aspect of the above described lane departure prevention apparatus, the determining device is configured to set at least one of the first and second threshold values to be smaller as curvature radius of the driving lane becomes smaller.

According to this aspect, as described later in detail, the unstable behavior of the vehicle can be prevented effectively by preventing the skid of the wheel.

<3>

In another aspect of the above described lane departure prevention apparatus, the controlling device is configured to control the braking device to start applying the braking force to the rear wheel after a predetermined time has elapsed since the braking force starts to be applied to the front wheel.

According to this aspect, it is possible to effectively prevent the rear wheel from skidding firstly before the front wheel skids, because the braking force starts to be applied to the rear wheel after the braking force starts to be applied to the front wheel.

<4>

In another aspect of the above described lane departure prevention apparatus that is configured to start applying the braking force to the rear wheel after the predetermined time has elapsed since the braking force starts to be applied to the front wheel, the controlling device is configured to set the predetermined time to be longer as curvature radius of the driving lane becomes smaller.

According to this aspect, as described later in detail, the unstable behavior of the vehicle can be prevented effectively by preventing the skid of the wheel (especially, preventing the rear wheel from skidding firstly before the front wheel skids).

<5>

In another aspect of the above described lane departure prevention apparatus, the controlling device is configured to stop applying the braking force from the braking device if it is determined that the slip ratio of the front wheel is larger than the first threshold value and/or it is determined that the slip ratio of the rear wheel is larger than the second threshold value.

According to this aspect, the unstable behavior of the vehicle that is caused by applying the braking force can be prevented, because the controlling device stops applying the braking force (namely, decreases the braking force to be zero).

Each of FIG. 11(a) to FIG. 11(e) is a graph illustrating another example of the relationship between the first and second threshold values and the curvature radius.

Figure 12A:
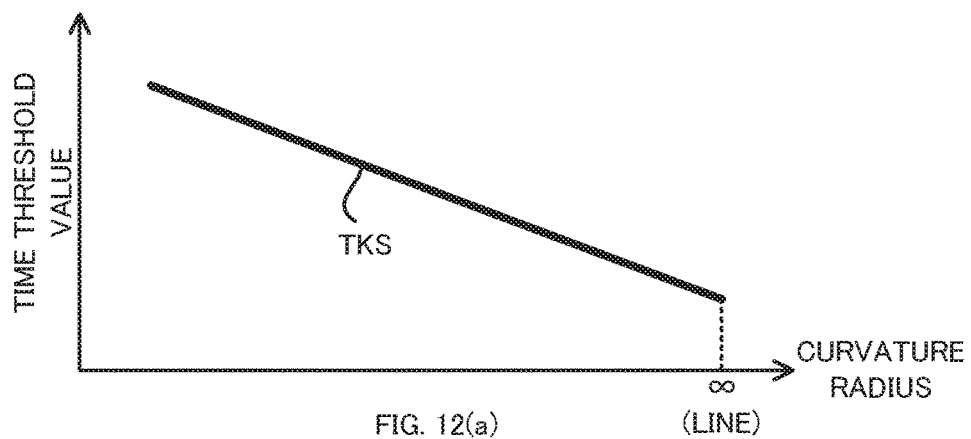
Figure 12B:
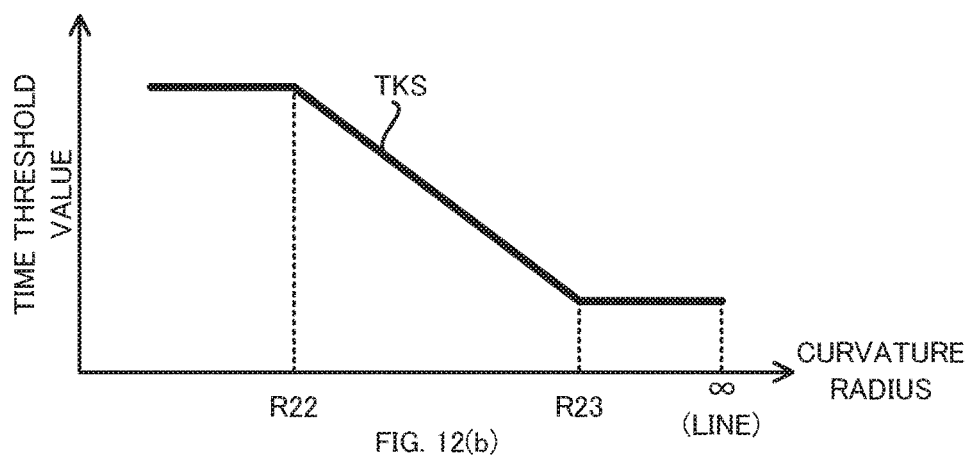
Figure 12C:
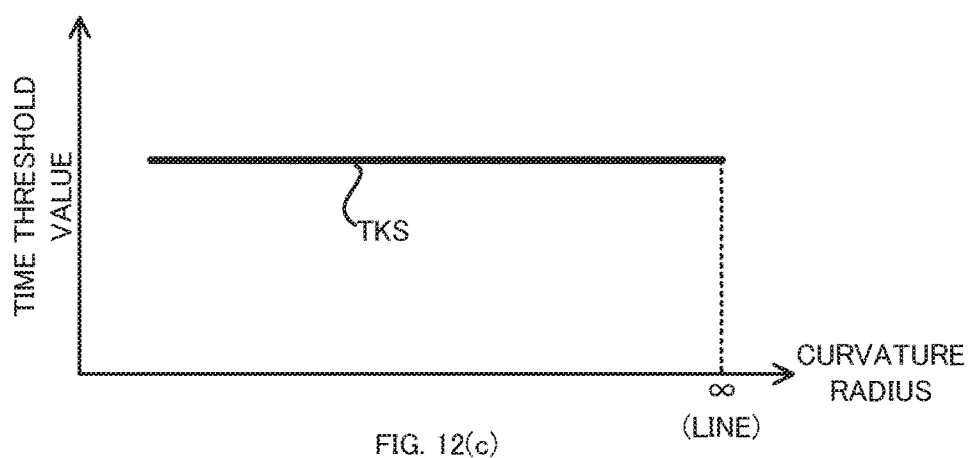

Each of FIG. 12(a) to FIG. 12(c) is a graph illustrating another example of the relationship between the time threshold value and the curvature radius.

DESCRIPTION OF EMBODIMENTS

Hereinafter, with reference to drawings, one embodiment of a lane departure prevention apparatus of the present invention will be described. In the following description, a vehicle 1 to which one embodiment of the lane departure prevention apparatus of the present invention is adapted will be described.

(1) Structure of Vehicle 1

Figure 1:
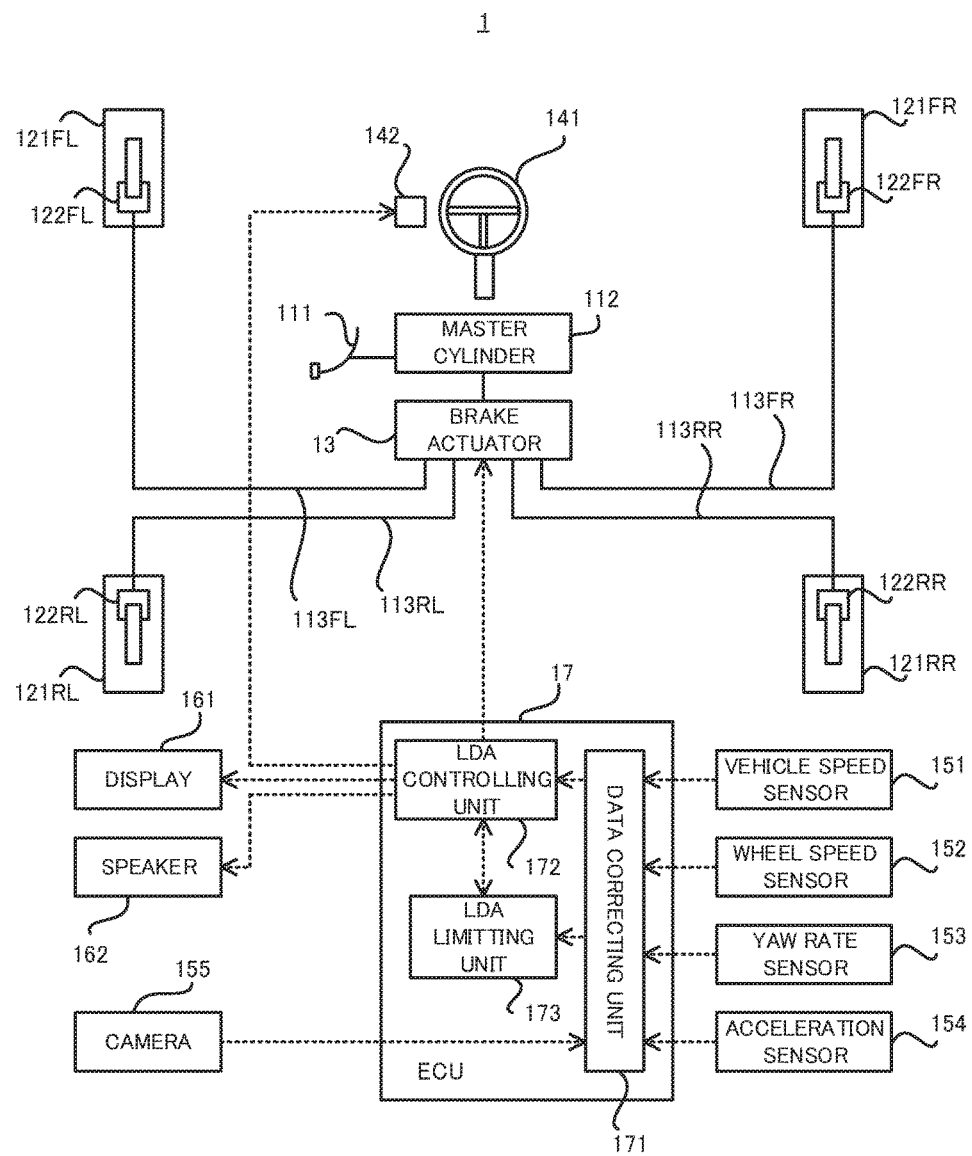
FIG. 1 is a block diagram that illustrates one example of a structure of a vehicle of the present embodiment.

Firstly, with reference to a block diagram illustrated in FIG. 1, the structure of the vehicle 1 of the present embodiment will be explained. As illustrated in FIG. 1, the vehicle 1 has: a brake pedal 111; a master cylinder 112; a brake pipe 113FL; a brake pipe 113RL; a brake pipe 113FR; a brake pipe 113RR; a left front wheel 121FL; a left rear wheel 121RL; a right front wheel 121FR; a right rear wheel 121RR; a wheel cylinder 122FL; a wheel cylinder 122RL; a wheel cylinder 122FR; a wheel cylinder 122RR; a brake actuator 13; a steering wheel 141, a vibration actuator 142; a vehicle speed sensor 151; a wheel speed sensor 152; a yaw rate sensor 153; an acceleration sensor 154; a camera 155; a display 161; a speaker 162; and an ECU (Electronic Control Unit) 17 that is one example of the above described "lane departure prevention apparatus".

The brake pedal 111 is a pedal that is pedaled by a driver to brake the vehicle 1. The master cylinder 112 is configured to adjust pressure of brake fluid (alternatively, any fluid) in the master cylinder 112 to be pressure based on a pedaled amount of the brake pedal 111. The pressure of the brake fluid in the master cylinder 112 is transmitted to the wheel cylinders 122FL, 122RL, 122FR and 122RR through the brake pipes 113FL, 113RL, 113FR and 113RR, respectively. The braking forces based on the pressures of the brake fluid transmitted to the wheel cylinders 122FL, 122RL, 122FR and 122RR are applied to the left front wheel 121FL, the left rear wheel 121RL, the right front wheel 121FR and the right rear wheel 121RR, respectively.

The brake actuator 13 is configured to adjust the pressure of the brake fluid transmitted to each of the wheel cylinders 122FL, 122RL, 122FR and 122RR under the control of the ECU 17, independently from the pedaled amount of the brake pedal 111. Therefore, the brake actuator 13 is configured to adjust the braking force applied to each of the left front wheel 121FL, the left rear wheel 121RL, the right front wheel 121FR and the right rear wheel 121RR, independently from the pedaled amount of the brake pedal 111.

The steering wheel 141 is an operational device that is operated by the driver to steer the vehicle 1 (namely, to turn a turned wheel). Note that each of the left front wheel 121FL and the right front wheel 121FR corresponds to the turned wheel in the present embodiment. The vibration actuator 142 is configured to vibrate the steering wheel 141 under the control of the ECU 17.

The vehicle speed sensor 151 is configured to detect vehicle speed Vv of the vehicle 1. The wheel speed sensor 152 is configured to detect wheel speed Vw of each of the left front wheel 121FL, the left rear wheel 121RL, the right front wheel 121FR and the right rear wheel 121RR. The yaw rate sensor 153 is configured to detect yaw rate γ of the vehicle 1. The acceleration sensor 154 is configured to detect acceleration A (specifically, acceleration A1 in a longitudinal direction and acceleration A2 in a lateral direction) of the vehicle 1. The camera 155 is an imaging device that is configured to capture circumstance in front of the vehicle 1. Detection data that represents the detection result of the vehicle speed sensor 151 to the acceleration sensor 154 and image data that represents an image captured by the camera 155 are outputted to the ECU 17.

The display 161 is configured to display any information under the control of the ECU 17. The speaker 162 is configured to output any sound under the control of the ECU 17.

The ECU 17 is configured to control entire operation of the vehicle 1. Especially in the present embodiment, the ECU 17 is configured to perform a lane departure prevention operation for preventing the vehicle 1 from departing (in other words, deviating) from a driving lane on which the vehicle 1 is currently traveling (in other words, moving). Therefore, the ECU 17 is configured to function as a controlling apparatus for realizing what we call LDA (Lane Departure Alert) or LDP (Lane Departure Prevention).

In order to perform the lane departure prevention operation, the ECU 17 includes, as processing blocks that are logically realized in the ECU 17 or processing circuits that are physically realized in the ECU 17, a data correcting unit 171, a LDA controlling unit 172 that is one example of the above described "controlling device" and a LDA limiting unit 173 that is one example of the above described "determining device". Although an operation of each of the data correcting unit 171, the LDA controlling unit 172 and the LDA limiting unit 173 will be described later in detail with reference to FIG. 2 and so on, overview of the operation will be briefly described here. The data correcting unit 171 is configured to correct the detection data that represents the detection result of the vehicle speed sensor 151 to the acceleration sensor 154 and the image data that represents the image captured by the camera 155. The LDA controlling unit 172 is configured to control the brake actuator 13 on the basis of the detection data and the image data corrected by the data correcting unit 171 so that the prevention yaw moment that is capable of preventing the vehicle 1 from departing from the driving lane is applied to the vehicle 1 by using the braking force applied to at least one of the left front wheel 121FL, the left rear wheel 121RL, the right front wheel 121FR and the right rear wheel 121RR, if there is a possibility that the vehicle 1 departs from the driving lane on which the vehicle 1 is currently traveling. Note that "preventing the vehicle 1 from departing from the driving lane" in the present embodiment means allowing actual departing distance of the vehicle 1 from the driving lane when the prevention yaw moment is applied to be smaller than a predicted departing distance of the vehicle 1 from the driving lane when the prevention yaw moment is not applied. The LDA limiting device 173 is configured to determine whether or not to stop applying the prevention yaw moment (namely, whether or not to stop applying the braking force for applying the prevention yaw moment).

(2) Detail of Lane Departure Prevention Operation

Next, with reference to a flowchart illustrated in FIG. 2, the lane departure prevention operation performed by the ECU 17 will be described.

Figure 2:
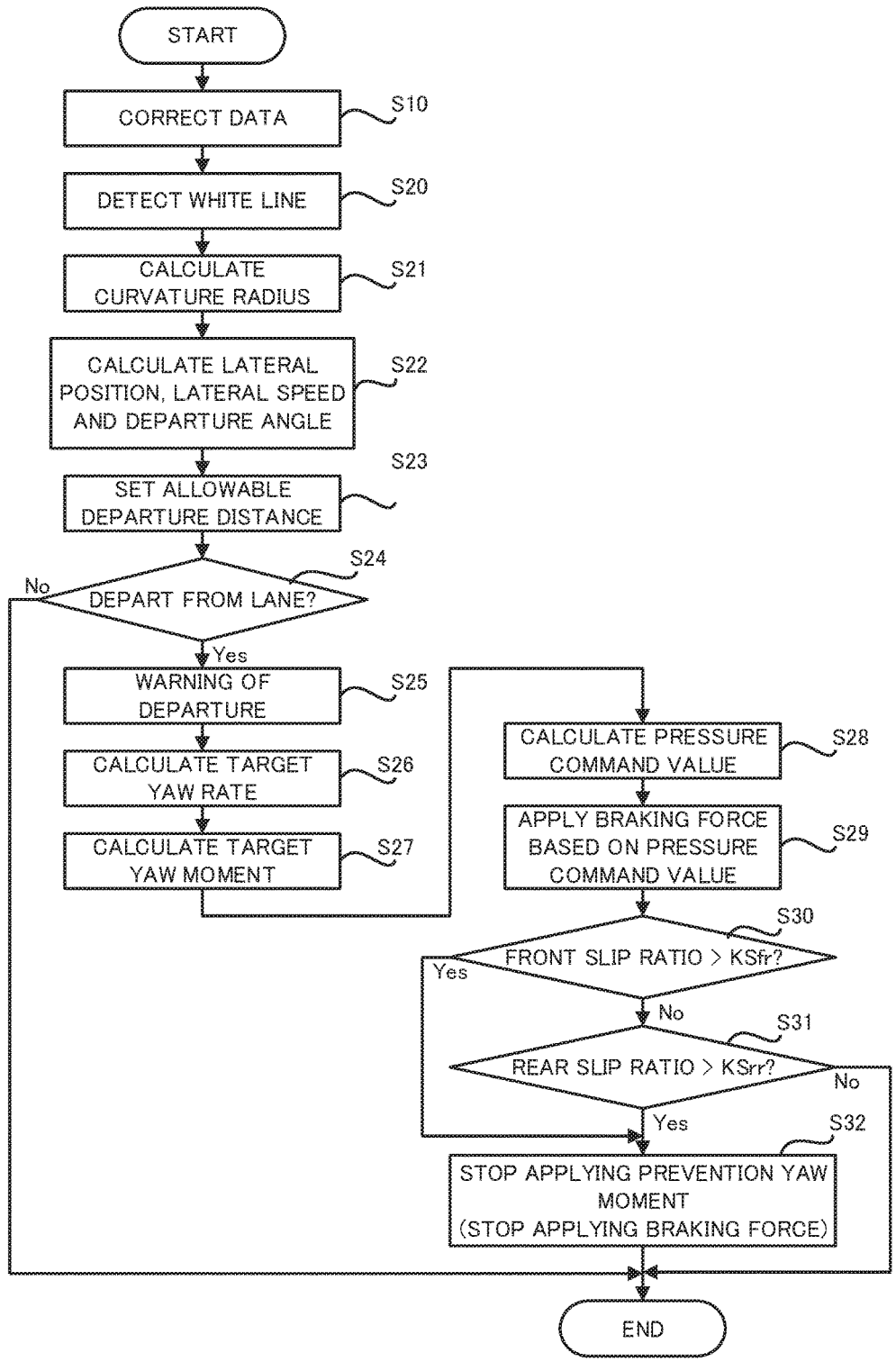
FIG. 2 is a flowchart that illustrates flow of a lane departure prevention operation.

As illustrated in FIG. 2, firstly, the data correcting unit 171 corrects the detection data that represents the detection result of the vehicle speed sensor 151 to the acceleration sensor 154 and the image data that represents the image captured by the camera 155 (a step S10).

Then, the LDA controlling unit 172 detects, in the image captured by the camera 155, a lane edge (in the present embodiment, a white line is used as one example of the lane edge) of the driving lane on which the vehicle 1 is currently traveling by analyzing the image data corrected at the step S10 (a step S20).

Then, the LDA controlling unit 172 calculates curvature radius R of the driving lane on which the vehicle 1 is currently traveling on the basis of the white line detected at the step S20 (a step S21). Note that the curvature radius R of the driving is substantially equivalent to curvature radius of the white line. Thus, the LDA controlling unit 172 may calculate the curvature radius of the white line detected at the step S20 and may use the calculated curvature radius as the curvature radius R of the driving lane. However, the LDA controlling unit 172 may calculate the curvature radius R of the driving lane on which the vehicle 1 is currently traveling by using positional information that is detected by a GPS (Global Positioning System) and map information that is used for a navigation operation.

Furthermore, the LDA controlling unit 172 calculates a current lateral position X of the vehicle 1 on the basis of the white line detected at the step S20 (step S22). The "lateral position X" in the present embodiment represents a distance from a center of the driving lane to the vehicle 1 (typically, a center of the vehicle 1) along a lane width direction that is perpendicular to a direction along which the driving lane extends (namely, a lane extending direction). In this case, it is preferable that one of a direction from the center of the driving lane toward a right side and a direction from the center of the driving lane toward a left side be set to a positive direction and the other one of the direction from the center of the driving lane toward the right side and the direction from the center of the driving lane toward the left side be set to a negative direction. Same argument can be applied to below described lateral speed V1, the above described yaw moment such as the prevention yaw moment, the above described acceleration A, the above described yaw rate γ and so on.

Furthermore, the LDA controlling unit 172 calculates a departure angle (a deviation angle) θ on the basis of the white line detected at the step S20 (a step S22). The "departure angle θ" in the present embodiment represents an angle between the driving lane and a longitudinal axis of the vehicle 1 (namely, an angle between the white line and the longitudinal axis of the vehicle 1).

Furthermore, the LDA controlling unit 172 calculates the lateral speed V1 of the vehicle 1 on the basis of time-sequential data of the lateral position X of the vehicle 1 calculated from the white line. However, the LDA controlling unit 172 may calculate the lateral speed V1 of the vehicle 1 on the basis of the detection result of the vehicle speed sensor 151 and the calculated departure angle θ and/or the detection result of the acceleration sensor 154. The "lateral speed V1" in the present embodiment represents the speed of the vehicle along the line width direction.

Furthermore, the LDA controlling unit 172 sets an allowable departure distance D (a step S23). The allowable departure distance D represents an allowable maximum value of a distance by which the vehicle 1 departs from the driving lane (namely, a distance by which the vehicle 1 departs from the white line) when the vehicle 1 departs from the driving lane. Therefore, the lane departure prevention operation is an operation for applying the prevention yaw moment so that the distance by which the vehicle 1 departs from the driving lane is within the allowable departure distance D.

The LDA controlling unit 172 may set the allowable departure distance D from a viewpoint of satisfying the requirement of the law or the like (for example, the requirement of NCAP (New Car Assessment Programe)). In this case, the allowable departure distance D that is set from the viewpoint of satisfying the requirement of the law or the like may be used as a default allowable departure distance D.

There is a high possibility that the departure distance of the vehicle 1 (namely, the distance by which the vehicle 1 departs from the driving lane) when the vehicle 1 departs from the driving lane becomes larger in the case where the departure angle θ is relatively large, compared to the case where the departure angle θ is relatively small. Similarly, there is a high possibility that the departure distance of the vehicle 1 when the vehicle 1 departs from the driving lane becomes larger in the case where the lateral speed V1 is relatively large, compared to the case where the lateral speed V1 is relatively small. Namely, there is a high possibility that the prevention yaw moment that is applied to the vehicle 1 so that the departure distance of the vehicle 1 is within the allowable departure distance D becomes larger in the case where at least one of the departure angle θ and the lateral speed V1 is relatively large, compared to the case where at least one of the departure angle θ and the lateral speed V1 is relatively small. On the other hand, applying the excessively large prevention yaw moment may result in unstable behavior of the vehicle 1. Thus, the LDA controlling unit 172 may set the allowable departure distance D (alternatively, may adjust the default allowable departure distance D) on the basis of at least one of the departure angle θ and the lateral speed V1 calculated at the step S22. For example, the LDA controlling unit 172 may set or adjust the allowable departure distance D so that the allowable departure distance D becomes larger as at least one of the departure angle θ and the lateral speed V1 becomes larger.

Then, the LDA controlling unit 172 determines whether or not there is a possibility that the vehicle 1 departs from the driving lane on which the vehicle 1 is currently traveling (step S24). Specifically, the LDA controlling unit 172 calculates a future lateral position Xf. For example, the LDA controlling unit 172 calculates, as the future lateral position Xf, the lateral position X at the timing when the vehicle 1 will have moved by a distance corresponding to a front watching distance (a look ahead distance) from the current position. The future lateral position Xf can be calculated by adding to (or subtracting from) the current lateral position X a value obtained by multiplying the lateral speed V1 and time Δt that is necessary for the vehicle 1 to move by the front watching distance. Then, the LDA controlling unit 172 determines whether or not an absolute value of the future lateral position Xf is equal to or larger than a departure threshold value. If the vehicle 1 is parallel to the lane extending direction, the departure threshold value is a value determined on the basis of width of the driving lane and width of the vehicle 1, for example. Specifically, the departure threshold value is "(the width of the driving lane−the width of the vehicle 1)/2". In this case, a situation where the absolute value of the future lateral position Xf is equal to the departure threshold value corresponds to a situation where a side wall of the vehicle 1 (for example, one of side walls of the vehicle 1 that is not closer to the center of the driving lane) along the lane width direction is on the white line. A situation where the absolute value of the future lateral position Xf is larger than the departure threshold value corresponds to a situation where the side wall of the vehicle 1 (for example, one of the side walls of the vehicle 1 that is not closer to the center of the driving lane) along the lane width direction is outside the white line. Thus, if the absolute value of the future lateral position Xf is not equal to or larger than the departure threshold value, the LDA controlling unit 172 determines that there is no possibility that the vehicle 1 departs from the driving lane on which the vehicle 1 is currently traveling. On the other hand, if the absolute value of the future lateral position Xf is equal to or larger than the departure threshold value, the LDA controlling unit 172 determines that there is a possibility that the vehicle 1 departs from the driving lane on which the vehicle 1 is currently traveling. However, the vehicle 1 may not be parallel to the lane extending direction, and thus any value that is different from the above described value may be used as the departure threshold value.

Note that the above described operation is one example of the operation for determining whether or not there is a possibility that the vehicle 1 departs from the driving lane on which the vehicle 1 is currently traveling. Therefore, the LDA controlling unit 172 may determine whether or not there is a possibility that the vehicle 1 departs from the driving lane on which the vehicle 1 is currently traveling, by using another determining method. Note that a situation where the vehicle 1 will get across or will be on the white line in near future (for example, at the timing when the vehicle 1 will have moved by the distance corresponding to the above described front watching distance).

As a result of the determination at the step S24, if it is determined that there is no possibility that the vehicle 1 departs from the driving lane (the step S24: No), the lane departure prevention operation illustrated in FIG. 2 is terminated. Therefore, processes from a step S25 to a step S32 that is performed when it is determined that there is a possibility that the vehicle 1 departs from the driving lane is not performed. Namely, the LDA controlling unit 172 controls the brake actuator 13 not to apply the prevention yaw moment to the vehicle 1 (namely, not to apply the braking force for applying the prevention yaw moment to the vehicle 1). Moreover, the LDA controlling unit 172 does not warn the driver that there is a possibility that the vehicle 1 departs from the driving lane.

If the lane departure prevention operation illustrated in FIG. 2 is terminated due to the determination that there is no possibility that the vehicle 1 departs from the driving lane, the ECU 17 may start the lane departure prevention operation illustrated in FIG. 2 again after a first predetermined period (for example, several milli seconds to several dozen milli second) has elapsed. Namely, the lane departure prevention operation illustrated in FIG. 2 is performed periodically with the first predetermined period. Note that the first predetermined period is a period corresponding to a default period with which the lane departure prevention operation illustrated in FIG. 2 is performed periodically.

On the other hand, as a result of the determination at the step S24, if it is determined that there is a possibility that the vehicle 1 departs from the driving lane (the step S24: Yes), the LDA controlling unit 172 warns the driver that there is a possibility that the vehicle 1 departs from the driving lane (a step S25). For example, the LDA controlling unit 172 may control the display 161 to display the image for informing that there is a possibility that the vehicle 1 departs from the driving lane. Alternatively, for example, the LDA controlling unit 172 may control the vibration actuator 142 in order to inform the driver by the vibration of the steering wheel 141 that there is a possibility that the vehicle 1 departs from the driving lane, in addition to or instead of controlling the display 161 as described above. Alternatively, for example, the LDA controlling unit 172 may control the speaker (what we call a buzzer) 162 in order to inform the driver by the alarm that there is a possibility that the vehicle 1 departs from the driving lane, in addition to or instead of controlling at least one of the display 161 and the vibration actuator 142 as described above.

If it is determined that there is a possibility that the vehicle 1 departs from the driving lane, furthermore, the LDA controlling unit 172 controls the brake actuator 13 to apply the braking force for applying the prevention yaw moment to the vehicle 1 (a step S26 to a step S29).

Specifically, if there is a possibility that the vehicle 1 departs from the driving lane, there is a high possibility that the vehicle 1 moves to be away from the center of the driving lane. Thus, if moving trajectory (in other words, moving locus) of the vehicle 1 is changed from current moving trajectory along which the vehicle 1 moves to be away from the center of the driving lane to new moving trajectory along which the vehicle 1 moves to approach the center of the driving lane, the departure of the vehicle 1 from the driving lane is prevented. Thus, the LDA controlling unit 172 calculates new moving trajectory along which the vehicle 1 that has moved to be away from the center of the driving lane will move to approach the center of the driving lane on the basis of the detection data, the image data, the detected white line, the calculated curvature radius R, the calculated lateral position X, the calculated lateral speed V1, the calculated departure angle θ and set allowable departure distance D. In this case, the LDA controlling unit 172 calculates new moving trajectory that satisfies the requirement of the allowable departure distance D set at the step S23. Furthermore, the LDA controlling unit 172 calculates, as target yaw rate $\gamma_{tgt}$, yaw rate that is predicted to occur (in other words, to be generated) in the vehicle 1 if the vehicle 1 moves along the calculated new moving trajectory (a step S26).

Then, the LDA controlling unit 172 calculates, as target yaw moment $M_{tgt}$, yaw moment that should be applied to the vehicle 1 to generate the target yaw rate $\gamma_{tgt}$ in the vehicle 1 (a step S27). Note that the target yaw moment $M_{tgt}$ is equivalent to the prevention yaw moment.

Then, the LDA controlling unit 172 calculates the braking forces that are capable of applying the target yaw moment $M_{tgt}$ to the vehicle 1. In this case, the LDA controlling unit 172 calculates the braking force that is applied to each of the left front wheel 121FL, the left rear wheel 121RL, the right front wheel 121FR and the right rear wheel 121RR, separately. Then, the LDA controlling unit 172 calculates pressure command values that specify the pressure of the brake fluid necessary for generating the calculated braking force (a step S28). In this case, the LDA controlling unit 172 calculates the pressure command value that specifies the pressure of the brake fluid in each of the wheel cylinders 122FL, 122RL, 122FR and 122RR, separately.

For example, if it is determined that there is a possibility that the vehicle 1 departs from the driving lane to get across the white line that is located at the right side with respect to the moving direction of the vehicle 1, the prevention yaw moment that is capable of turning the vehicle 1 toward the left side with respect to the moving direction of the vehicle 1 may be applied in order to prevent the vehicle 1 from departing from the driving lane. In this case, the prevention yaw moment that is capable of turning the vehicle 1 toward the left side can be applied to the vehicle 1 by applying the braking force to at least one of the left front wheel 121FL and the left rear wheel 121RL and not applying the braking force to each of the right front wheel 121FR and the right rear wheel 121RR, or by applying the relatively small braking force to at least one of the right front wheel 121FR and the right rear wheel 121RR and applying the relatively large braking force to at least one of the left front wheel 121FL and the left rear wheel 121RL. On the other hand, if it is determined that there is a possibility that the vehicle 1 departs from the driving lane to get across the white line that is located at the left side with respect to the moving direction of the vehicle 1, the prevention yaw moment that is capable of turning the vehicle 1 toward the right side with respect to the moving direction of the vehicle 1 can be applied to the vehicle 1 by applying the braking force to at least one of right front wheel 121FR and the right rear wheel 121RR and not applying the braking force to each of the left front wheel 121FL and the left rear wheel 121RL, or by applying the relatively small braking force to at least one of the left front wheel 121FL and the left rear wheel 121RL and applying the relatively large braking force to at least one of the right front wheel 121FR and the right rear wheel 121RR.

Then, the LDA controlling unit 172 controls the brake actuator 13 on the basis of the pressure command values calculated at the step S28. Therefore, the braking force based on the pressure command value is applied to at least one of the left front wheel 121FL, the left rear wheel 121RL, the right front wheel 121FR and the right rear wheel 121RR (a step S29). As a result, the prevention yaw moment that is equivalent to the target yaw moment $M_{tgt}$ is applied to the vehicle 1, and thus the departure of the vehicle 1 from the driving lane is prevented.

Then, when the prevention yaw moment is applied to the vehicle 1, the LDA limiting unit 173 determines whether or not to stop applying the prevention yaw moment on the basis of a front slip ratio and a rear slip ratio. The front slip ratio is calculated on the basis of a slip ratio of at least one of the left front wheel 121FL and the right front wheel 121FR. The rear slip ratio is calculated on the basis of a slip ratio of at least one of the left rear wheel 121RL and the right rear wheel 121RR.

Thus, the LDA limiting unit 173 calculates the front slip ratio. Note that the front slip ratio may be an average of the slip ratio of the left front wheel 121FL and the slip ratio of the right front wheel 121FR. The front slip ratio may be a weighted average of the slip ratio of the left front wheel 121FL and the slip ratio of the right front wheel 121FR. The slip ratio of the left front wheel 121FL may be used as the front slip ratio. For example, if it is determined that there is a possibility that the vehicle 1 departs from the driving lane to get across the white line that is located at the right side with respect to the moving direction of the vehicle 1, the braking force may be applied to the left front wheel 121FL and thus the slip ratio of the left front wheel 121FL may be used as the front slip ratio. The slip ratio of the right front wheel 121FR may be used as the front slip ratio. For example, if it is determined that there is a possibility that the vehicle 1 departs from the driving lane to get across the white line that is located at the left side with respect to the moving direction of the vehicle 1, the braking force may be applied to the right front wheel 121FR and thus the slip ratio of the right front wheel 121FR may be used as the front slip ratio. The slip ratio of the left front wheel 121FL can be calculated from the wheel speed Vw of the left front wheel 121FL and the vehicle speed Vv. The slip ratio of the right front wheel 121FR can be calculated from the wheel speed Vw of the right front wheel 121FR and the vehicle speed Vv.

Moreover, the LDA limiting unit 173 calculates the rear slip ratio. The rear slip ratio may be an average of the slip ratio of the left rear wheel 121RL and the slip ratio of the right rear wheel 121RR. The rear slip ratio may be a weighted average of the slip ratio of the left rear wheel 121RL and the slip ratio of the right rear wheel 121RR. The slip ratio of the left rear wheel 121RL may be used as the rear slip ratio. For example, if it is determined that there is a possibility that the vehicle 1 departs from the driving lane to get across the white line that is located at the right side with respect to the moving direction of the vehicle 1, the braking force may be applied to the left rear wheel 121RL and thus the slip ratio of the left rear wheel 121RL may be used as the rear slip ratio. The slip ratio of the right rear wheel 121RR may be used as the rear slip ratio. For example, if it is determined that there is a possibility that the vehicle 1 departs from the driving lane to get across the white line that is located at the left side with respect to the moving direction of the vehicle 1, the braking force may be applied to the right rear wheel 121RR and thus the slip ratio of the right rear wheel 121RR may be used as the rear slip ratio. The slip ratio of the left rear wheel 121RL can be calculated from the wheel speed Vw of the left rear wheel 121RL and the vehicle speed Vv. The slip ratio of the right rear wheel 121RR can be calculated from the wheel speed Vw of the right rear wheel 121RR and the vehicle speed Vv.

Then, the LDA limiting unit 173 determines whether or not the front slip ratio is larger than a first slip threshold value KSfr that is one example of the "first threshold value" (a step S30). Moreover, the LDA limiting unit 173 determines whether or not the rear slip ratio is larger than a second slip threshold value KSrr that is one example of the "second threshold value" (a step S31). Note that the determination at the step S31 may be firstly performed and then the determination at the step S30 may be performed, although FIG. 2 illustrates an example in which the determination at the step S30 is firstly performed and then the determination at the step S31 is performed.

Here, with reference to a graph illustrated in FIG. 3, the first slip threshold value KSfr and the second slip threshold value KSrr will be described.

Figure 3:
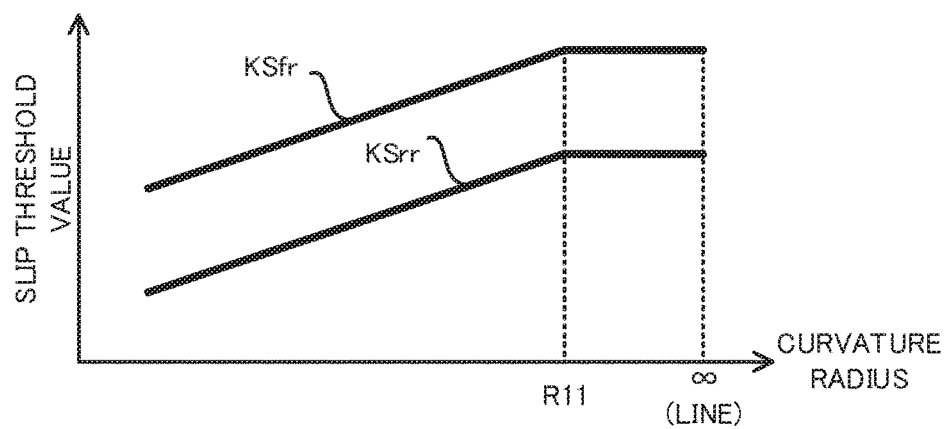
FIG. 3 is a graph illustrating a relationship between first and second threshold values and curvature radius.

As illustrated in FIG. 3, each of the first slip threshold value KSfr and the second slip threshold value KSrr varies depending on the curvature radius R. Specifically, each of the first slip threshold value KSfr and the second slip threshold value KSrr becomes smaller as the curvature radius R becomes smaller in a region at which the curvature radius R is smaller than a predetermined radius R11. On the other hand, each of the first slip threshold value KSfr and the second slip threshold value KSrr is a fixed value regardless of the curvature radius R in a region at which the curvature radius R is larger than the predetermined radius R11. Therefore, the LDA limiting unit 173 performs the determinations at the step S30 and the step S31 by using the first slip threshold value KSfr and the second slip threshold value KSrr based on the curvature radius R calculated at the step S21. In other words, the LDA limiting unit 173 sets the first slip threshold value KSfr and the second slip threshold value KSrr on the basis of the curvature radius R calculated at the step S21 and then performs the determinations at the step S30 and the step S31 by using the set first slip threshold value KSfr and the set second slip threshold value KSrr.

Moreover, as illustrated in FIG. 3, the second slip threshold value KSrr is smaller than the first slip threshold value KSfr. Namely, the second slip threshold value KSrr corresponding to a certain curvature radius R is smaller than the first slip threshold value KSfr corresponding to this certain curvature radius R. Note that the reason why the second slip threshold value KSrr is smaller than the first slip threshold value KSfr is mainly to preferentially prevent the left rear wheel 121RL and the right rear wheel 121RR from skidding firstly before the left front wheel 121FL and the right front wheel 121FR skid while ensuring the opportunity of applying the prevention yaw moment to the vehicle 1 as much as possible.

The first slip threshold value KSfr may be a threshold value that is set on the basis of tire limit. The tire limit corresponds to the maximum of the slip ratio by which the left front wheel 121FL and the right front wheel 121FR are allowed to ensure desired grip force (specifically, desired grip force along at least one of a longitudinal direction that is a direction along which each of the left front wheel 121FL and the right front wheel 121FR rolls and a lateral direction that is a width direction of each of the left front wheel 121FL and the right front wheel 121FR). Specifically, the first slip threshold value KSfr may be a threshold value that is equal to or smaller than the tire limit. On the other hand, the second slip threshold value KSrr may be a threshold value obtained by subtracting a predetermined margin from the tire limit, because the second slip threshold value KSrr is smaller than the first slip threshold value KSfr.

Again in FIG. 2, as a result of the determinations at the step S30 and the step S31, if it is determined that the front slip ratio is larger than the first slip threshold value KSfr (the step S30: Yes) and/or the rear slip ratio is larger than the second slip threshold value KSrr (the step S31: Yes), the LDA limiting unit 173 determines to stop applying the prevention yaw moment (a step S32). As a result, the LDA controlling unit 172 stops applying the braking force for applying the prevention yaw moment to the vehicle 1. Namely, the LDA controlling unit 172 controls the brake actuator 13 not to apply the braking force for applying the prevention yaw moment to the vehicle 1.

After the LDA controlling unit 172 stops applying the prevention yaw moment, the ECU 17 terminates the lane departure prevention operation illustrated in FIG. 2. If the lane departure prevention operation illustrated in FIG. 2 is terminated after the LDA controlling unit 172 stops applying the prevention yaw moment, it is preferable that the ECU 17 start the lane departure prevention operation illustrated in FIG. 2 again after a second predetermined period (for example, hundreds milli seconds to several seconds) that is larger than the above described first predetermined period has elapsed. The reason why the lane departure prevention operation starts again after the second predetermined period has elapsed is to prevent the operation of starting applying the prevention yaw moment on the basis of the determination that there is a possibility that the vehicle 1 departs from the driving lane and the operation of stopping applying the prevention yaw moment on the basis of the front slip ratio and the rear slip ratio from being repeated many times in a short period. Thus, the second predetermined period may be set from a viewpoint of ensuring an adequate interval between the operation of starting applying the prevention yaw moment and the operation of stopping applying the prevention yaw moment so that the repetition of the operation of starting applying the prevention yaw moment and the operation of stopping applying the prevention yaw moment does not annoy the driver. Alternatively, the second predetermined period may be a period necessary for the LDA controlling unit 172 to determine that there is no possibility that the vehicle 1 departs from the driving lane by continuing to apply the prevention yaw moment to the vehicle 1 after the LDA controlling unit 172 has once determined that there is a possibility that the vehicle 1 departs from the driving lane. In this case, if the LDA controlling unit 172 stops applying the prevention yaw moment after it is determined that there is a possibility that the vehicle 1 departs from the driving lane, the LDA controlling unit 172 does not apply the prevention yaw moment for preventing the current departure of the vehicle 1 again.

On the other hand, as a result of the determinations at the step S30 and the step S31, if it is determined that the front slip ratio is smaller than the first slip threshold value KSfr (the step S30: No) and the rear slip ratio is smaller than the second slip threshold value KSrr (the step S31: No), the LDA limiting unit 173 determines not to stop applying the prevention yaw moment. As a result, the LDA controlling unit 172 continues to apply the braking force for applying the prevention yaw moment to the vehicle 1. Then, the ECU 17 terminates the lane departure prevention operation illustrated in FIG. 2. If the lane departure prevention operation illustrated in FIG. 2 is terminated without stopping applying the braking force, the ECU 17 starts the lane departure prevention operation illustrated in FIG. 2 again after the above described first predetermined period has elapsed. Namely, the ECU 17 starts the lane departure prevention operation again while continuing to apply the prevention yaw moment to the vehicle 1. In this case, if it is determined at the step S24 of the re-started lane departure prevention operation that there is still a possibility that the vehicle 1 departs from the driving lane despite the prevention yaw moment being applied to the vehicle 1 (the step S24: Yes), the LDA controlling unit 172 continues to apply the prevention yaw moment by repeating the processes after the step S25 (however, not including the case where the process at the step S32 is performed). On the other hand, if it is determined at the step S24 of the re-started lane departure prevention operation that there is not possibility that the vehicle 1 departs from the driving lane due to the prevention yaw moment being applied to the vehicle 1 (the step S24: No), the LDA controlling unit 172 stops applying the prevention yaw moment and then the lane departure prevention operation is terminated.

Note that the LDA limiting the unit 173 determines not to stop applying the prevention yaw moment if the front slip ratio is equal to the first slip threshold value KSfr and the rear slip ratio is equal to the second slip threshold value KSrr (the step S30: No and the step S31: No), in an example illustrated in FIG. 2. However, the LDA limiting the unit 173 may determine to stop applying the prevention yaw moment if the front slip ratio is equal to the first slip threshold value KSfr and/or the rear slip ratio is equal to the second slip threshold value KSrr.

(3) Technical Effect of Lane Departure Prevention Operation

Next, with reference to timing charts illustrated in FIG. 4 and FIG. 5, a technical effect achieved by the lane departure prevention operation of the present embodiment will be described.

According to the vehicle 1 in the present embodiment, the prevention yaw moment is applied to the vehicle 1 if there is a possibility that the vehicle 1 departs from the driving lane. Thus, the departure of the vehicle 1 from the driving lane is prevented.

On the other hand, depending on a driving condition of the vehicle 1 when the prevention yaw moment is applied to the vehicle 1, undesired yaw rate (namely, yaw rate that is different from desired yaw rate (namely, the target yaw rate $\gamma_{tgt}$) that should occur when the prevention yaw moment is applied) may occur in the vehicle 1 due to applying the braking force. There is a relatively high possibility that this undesired yaw rate occurs when at least one of the front slip ratio and the rear slip ratio becomes so large that the vehicle 1 cannot ensure the desired grip force, as described above.

Figure 4:
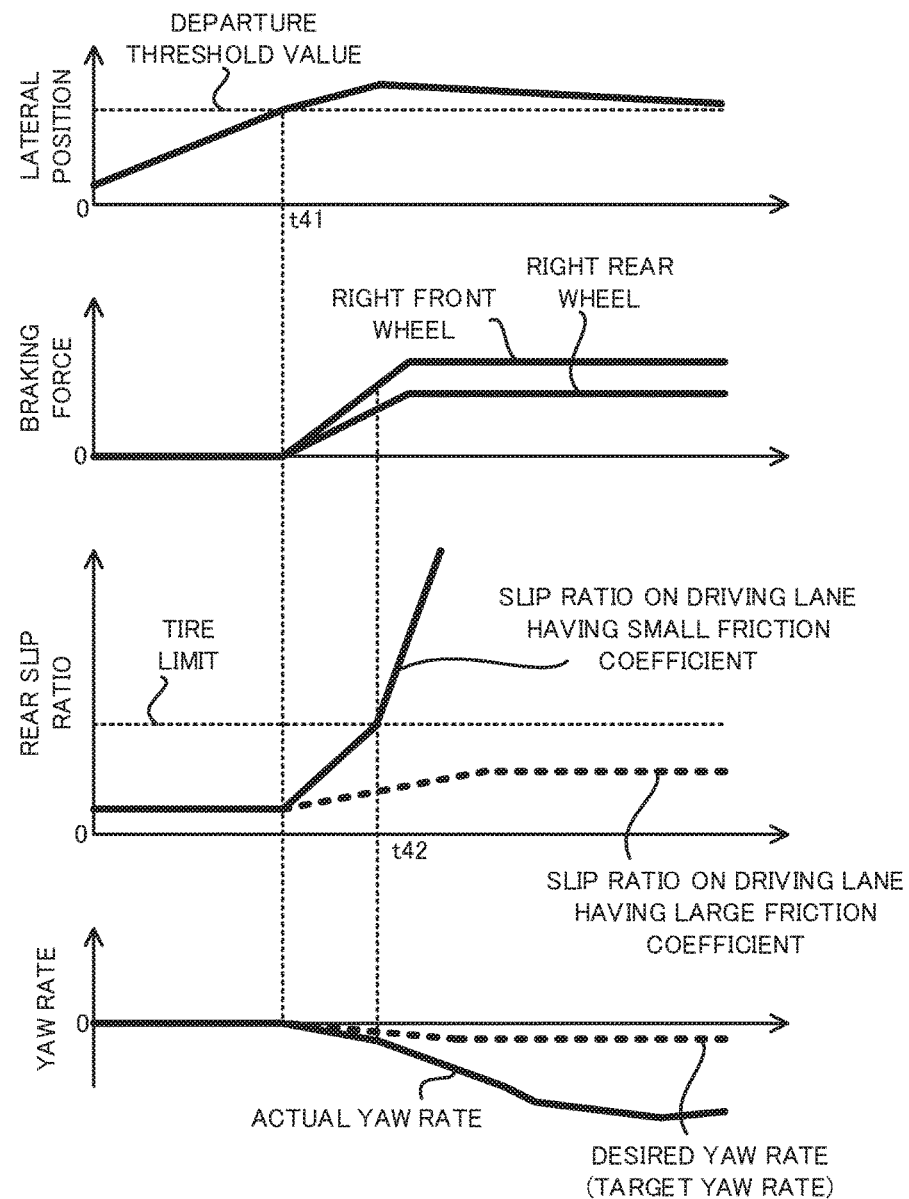
FIG. 4 is a timing chart illustrating a temporal transition of each of a future lateral position, a braking force, a rear slip ratio and yaw rate.

Specifically, for example, FIG. 4 is a timing chart illustrating a temporal transition of each of the future lateral position Xf, the braking force, the rear slip ratio and the yaw rate in the case where the braking force for applying the prevention yaw moment is applied to each of the right front wheel 121FR and the right rear wheel 121RR due to the determination that the absolute value of the future lateral position Xf is larger than the departure threshold value at a time t41. In the example illustrated in FIG. 4, it is assumed that the vehicle 1 travels on the driving lane on which a friction coefficient of a road surface is relatively small (alternatively, is smaller than a predetermined coefficient). In this case, as described above, the prevention yaw moment is calculated without using the coefficient of the road surface. Thus, the rear slip ratio (moreover, the front slip ratio in some cases that is not illustrated in FIG. 4) becomes larger in the case where the prevention yaw moment is applied to the vehicle 1 that travels on the driving lane on which the friction coefficient of the road surface is relatively small, compared to the case where the prevention yaw moment is applied to the vehicle 1 that travels on the driving lane on which the friction coefficient of the road surface is relatively large. Therefore, there is a possibility that the grip forces (especially, the grip forces in the lateral direction) of the right front wheel 121FR and the right rear wheel 121RR to which the braking force is applied becomes smaller due to the front slip ratio and the rear slip ratio being larger in the case where the prevention yaw moment is applied to the vehicle 1 that travels on the driving lane on which the friction coefficient of the road surface is relatively small, compared to the case where the prevention yaw moment is applied to the vehicle 1 that travels on the driving lane on which the friction coefficient of the road surface is relatively large. As a result, there is a possibility that the yaw rate that occurs in the vehicle 1 traveling on the driving lane on which the friction coefficient of the road surface is relatively small is larger than the yaw rate that occurs in the vehicle 1 traveling on the driving lane on which the friction coefficient of the road surface is relatively larger due to the grip forces of the right front wheel 121FR and the right rear wheel 121RR being smaller. Namely, there is a possibility that the yaw rate that occurs in the vehicle 1 traveling on the driving lane on which the friction coefficient of the road surface is relatively small is larger than the desired yaw rate (namely, the target yaw rate $\gamma_{tgt}$). Thus, there is a possibility that the undesired yaw rate occurs in the vehicle 1 that travels on the driving lane on which the friction coefficient of the road surface is relatively small. This undesired yaw rate may result in unstable behavior of the vehicle 1. Moreover, if the rear slip ratio exceeds the tire limit when this undesired yaw rate is occurring (a time t42 in FIG. 4), there is a possibility that at least one of the left rear wheel 121RL and the right rear wheel 121RR skids. Thus, there is a possibility that the unstable behavior of the vehicle 1 is actualized more clearly as the skid of the wheel. Therefore, the undesired yaw rate due to the increase of the rear slip ratio (moreover, the front slip ratio) may result in the unstable behavior of the vehicle 1.

Note that the situation where the actual yaw rate that actually occurs in the vehicle 1 is different from the desired yaw rate that should occur in the vehicle 1 when the preventing yaw rate is applied may arise not only in the case where the vehicle 1 travels on the driving lane on which the friction coefficient of the road surface is relatively small but also depending on the driving condition of the vehicle 1.

Thus, in the present embodiment, if it is determined that the front slip ratio is larger than the first slip threshold value KSfr and/or it is determined that the rear slip ratio is larger than the second slip threshold value KSrr, the application of the prevention yaw moment is stopped. Namely, the braking force that is applied to the vehicle 1 in order to prevent the departure of the vehicle 1 from the driving lane decreases to be zero. If the application of the prevention yaw moment is stopped (namely, the application of the braking force is stopped), the increase of the slip ratio of each of the left front wheel 121FL, the left rear wheel 121RL, the right front wheel 121FR and the right rear wheel 121RR is prevented. Thus, the grip force of each of the left front wheel 121FL, the left rear wheel 121RL, the right front wheel 121FR and the right rear wheel 121RR increases (in other words, is recovered), compared to the case where the application of the prevention yaw moment is not yet stopped. Namely, the grip force of the vehicle 1 increases (in other words, is recovered). Thus, the unstable behavior of the vehicle 1 due to the braking force being applied is prevented, compared to the case where the prevention yaw moment continues to be applied even if it is determined that the front slip ratio is larger than the first slip threshold value KSfr or it is determined that the rear slip ratio is larger than the second slip threshold value KSrr.

Figure 5:
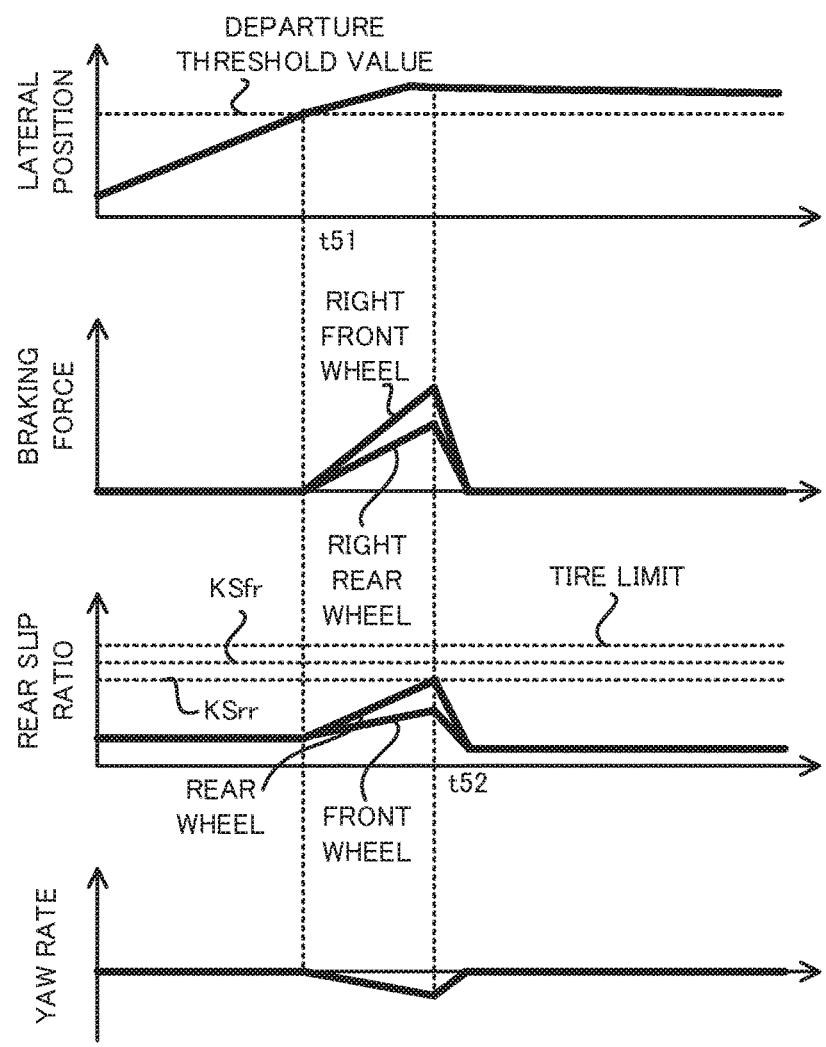
FIG. 5 is a timing chart illustrating a temporal transition of each of a future lateral position, a braking force, a rear slip ratio and yaw rate.

For example, as illustrated in FIG. 5, the prevention yaw moment is applied at a time t51, and thus the front slip ratio and the rear slip ratio increase. As a result, the rea slip ratio becomes larger than the second slip threshold value KSrr at a time t52. Thus, the application of the prevention yaw moment is stopped at the time t52. As a result, the increase of each of the front slip ratio and the rear slip ratio is prevented after the time t52. Thus, the occurrence of the undesired yaw rate in the vehicle 1 is prevented, and thus the unstable behavior of the vehicle 1 is prevented.

In addition, in the present embodiment, the second slip threshold value KSrr that is compared with the rear slip ratio is smaller than the first slip threshold value KSfr that is compared with the front slip ratio. Therefore, even if the rear slip ratio is not as large as the front slip ratio (namely, the left rear wheel 121RL and the right rear wheel 121RR do not skid easily, compared to the left front wheel 121FL and the right front wheel 121FR), the application of the prevention yaw moment is stopped at the timing when the rear slip ratio becomes larger than the second slip threshold value KSrr. Thus, the increase of the rear slip ratio is prevented more preferentially than the increase of the front slip ratio. Thus, the decrease of the grip forces (especially, the decrease of the grip forces along the lateral direction) of the left rear wheel 121RL and the right rear wheel 121RR is prevented more preferentially than the decrease of the grip forces (especially, the decrease of the grip forces along the lateral direction) of the left front wheel 121FL and the right front wheel 121FR. Namely, it is possible to preferentially prevent the left rear wheel 121RL and the right rear wheel 121RR from skidding firstly before the left front wheel 121FL and the right front wheel 121FR skid. Thus, according to the vehicle 1 in the present embodiment, the prevention yaw moment is applied to the vehicle 1 while the unstable behavior of the vehicle 1 is prevented more effectively by preferentially preventing the left rear wheel 121RL and the right rear wheel 121RR from skidding firstly before the left front wheel 121FL and the right front wheel 121FR skid.

Moreover, in the present embodiment, since the first slip threshold value KSfr is larger than the second slip threshold value KSrr, the process of stopping applying the prevention yaw moment due to the increase of the front slip ratio is not performed as often as the process of stopping applying the prevention yaw moment due to the rear slip ratio. Thus, it is possible to prevent the skid of the left rear wheel 121RL and the right rear wheel 121RR, which is preferably prevented, as much as possible by stopping applying the prevention yaw moment on the basis of the rear slip ratio and it is possible to ensure opportunity of applying the prevention yaw moment to the vehicle 1 as much as possible by reducing the frequency of stopping applying the prevention yaw moment on the basis of the front slip ratio. Note that common threshold value that is commonly compared with both of the front slip ratio and the rear slip ratio and that is small may be used, if the purpose of the present embodiment is only to stabilize the behavior of the vehicle 1 by preventing at least one of the left front wheel 121FL, the left rear wheel 121RL, the right front wheel 121FR and the right rear wheel 121RR from skidding. However, if the small common threshold value is used, the opportunity of applying the prevention yaw moment is reduced undesirably. On the other hand, in the present embodiment, since the first slip threshold value KSfr and the second slip threshold value KSrr are used separately and the second slip threshold value KSrr is smaller than the first slip threshold value KSfr, both of the technical effect of ensuring the opportunity of applying the prevention yaw moment to the vehicle 1 and the technical effect of preventing the unstable behavior of the vehicle 1 can be achieved, that is practically very useful.

Note that the grip force of the left front wheel 121FL along the longitudinal direction rapidly increases as the slip ratio of the left front wheel 121FL increases in a region at which the slip ratio of the left front wheel 121FL is in a range between 0% to about 20%. Moreover, the grip force of the left front wheel 121FL along the longitudinal direction gently decreases as the slip ratio of the left front wheel 121FL increases in a region at which the slip ratio of the left front wheel 121FL is larger than about 20%. On the other hand, the grip force of the left front wheel 121FL along the lateral direction rapidly decreases as the slip ratio of the left front wheel 121FL increases. Moreover, the grip force of the left front wheel 121FL along the lateral direction is much smaller than the grip force of the left front wheel 121FL along the longitudinal direction in a region at which the slip ratio of the left front wheel 121FL is larger than about 20%. Thus, if the slip ratio of the left front wheel 121FL is relatively large (or increases), there is a possibility that the skid of the left front wheel 121FL in the lateral direction occurs firstly before the skid of the left front wheel 121FL in the longitudinal direction occurs. The same is true of each of the left rear wheel 121RL, the right front wheel 121FR and the right rear wheel 121RR. Here, each of the left front wheel 121FL and the right front wheel 121RL is the turned wheel, as described above. Thus, even if the left front wheel 121FL and the right front wheel 121RL skid (typically, skid in the lateral direction), the grip forces of the left front wheel 121FL and the right front wheel 121RL can be increased (in other words, recovered) by controlling turned angle (in other words, steered angle) of each of the left front wheel 121FL and the right front wheel 121RL (for example, by making the skidding direction be same as the longitudinal direction). On the other hand, each of the left rear wheel 121RL and the right rear wheel 121RR is not the turned wheel (namely, is a non-turned wheel). Thus, if the left rear wheel 121RL and the right rear wheel 121RR skid (typically, skid in the lateral direction), the grip forces of the left rear wheel 121RL and the right rear wheel 121RR cannot be increased (in other words, recovered) easily, because the turned angle of each of the left rear wheel 121RL and the right rear wheel 121RR cannot be controlled. Therefore, it is technically useful to prevent the left rear wheel 121RL and the right rear wheel 121RR from skidding firstly before the left front wheel 121FL and the right front wheel 121FR skid not only from a viewpoint of characteristics of the behavior of the vehicle 1 (in other word, driving performance of the vehicle 1) that is described in the above described "Technical Problem" but also from a viewpoint of a difference in characteristics between the turned wheel and the non-turned wheel.

In addition, in the present embodiment, each of the first slip threshold value KSfr and the second slip threshold value KSrr becomes smaller as the curvature radius R is smaller. Here, each of the front slip ratio and the rea slip ratio increases more easily as the curvature radius R is smaller. Thus, the grip force (especially, the grip force in the lateral direction) of the left front wheel 121FL decreases more easily as the curvature radius R is smaller. As a result, the left front wheel 121FL skids (especially, skids in the lateral direction) more easily as the curvature radius R is smaller. The same is true of each of the left rear wheel 121RL, the right front wheel 121FR and the right rear wheel 121RR. In the present embodiment, considering this relationship between the curvature radius R and the slip ratio, the relatively small first slip threshold value KSfr is used in the case where the curvature radius R is relatively small (namely, in the case where the left front wheel 121FL, the left rear wheel 121RL, the right front wheel 121FR and the right rear wheel 121RR skid relatively easily) so that it is determined more easily that the front slip ratio is larger than the first slip threshold value KSfr and then the application of the braking force is stopped more easily. The Same is true of the second slip threshold value KSrr. Thus, it is possible to effectively prevent the unstable behavior of the vehicle 1 by preventing the skid of the left front wheel 121FL, the left rear wheel 121RL, the right front wheel 121FR and the right rear wheel 121RR.

(4) Modified Examples of Lane Departure Prevention Operation (4-1) First Modified Example of Lane Departure Prevention Operation With reference to FIG. 6, a first modified example of the lane departure prevention operation will be described. Note that a detailed description of a process that is same as the process in the above described lane departure prevention operation illustrated in FIG. 2 will be omitted by assigning same step number to the process.

Figure 6:
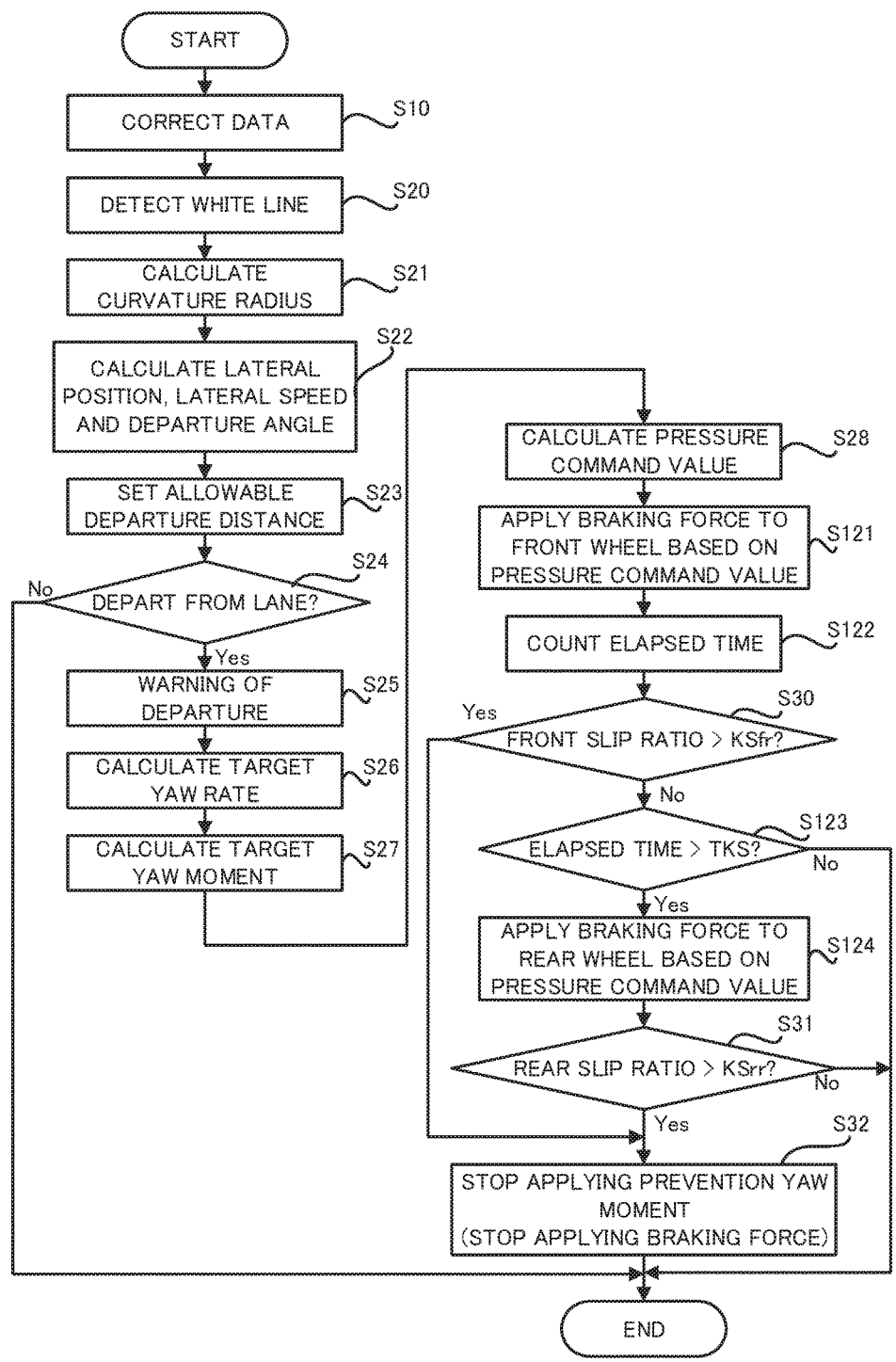
FIG. 6 is a flowchart that illustrates flow of a first modified example of a lane departure prevention operation.

As illustrated in FIG. 6, the above described processes from the step S10 to the step S28 are also performed in the first modified example.

In the first modified example, after the pressure command values are calculated at the step S28, the LDA controlling unit 172 controls the brake actuator 13 to apply the braking force based on the pressure command value to at least one of the left front wheel 121FL and the right front wheel 121FR (a step S121). At this timing, the braking force is not applied to the left rear wheel 121RL and the right rear wheel 121RR. Moreover, the LDA controlling unit 172 counts elapsed time after the braking force starts to be applied to at least one of the left front wheel 121FL and the right front wheel 121FR, after the braking force starts to be applied to at least one of the left front wheel 121FL and the right front wheel 121FR (a step S122). Then, the LDA limiting device 173 determines whether or not the front slip ratio is larger than the first slip threshold value KSfr when the braking force is applied to at least one of the left front wheel 121FL and the right front wheel 121FR (the step S30).

As a result of the determinations at the step S30, if it is determined that the front slip ratio is larger than the first slip threshold value KSfr (the step S30: Yes), the LDA limiting unit 173 determines to stop applying the prevention yaw moment (the step S32). After the LDA controlling unit 172 stops applying the prevention yaw moment, the LDA controlling unit 172 stops counting the elapsed time and resets the counted elapsed time because the application of the braking force to at least one of the left front wheel 121FL and the right front wheel 121FR is stopped. On the other hand, as a result of the determinations at the step S30, if it is determined that the front slip ratio is smaller than the first slip threshold value KSfr (the step S30: No), the LDA limiting device 173 determines whether or not the counted elapsed time is larger than a time threshold value TKS that is one example of the above described "predetermined time" (a step S123).

Figure 7:
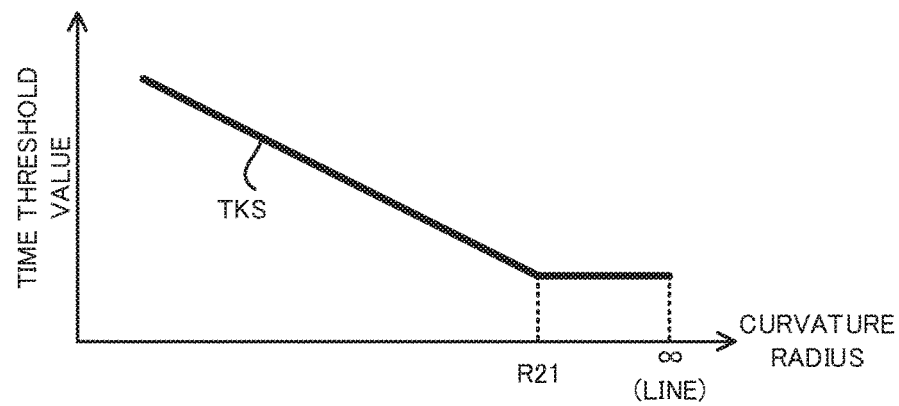
FIG. 7 is a graph illustrating a relationship between a time threshold value and curvature radius.

Here, with reference to a graph illustrated in FIG. 7, the time threshold value TKS will be described. As illustrated in FIG. 7, the time threshold value TKS varies depending on the curvature radius R. Specifically, the time threshold value TKS becomes larger as the curvature radius R becomes smaller in a region at which the curvature radius R is smaller than a predetermined radius R21. On the other hand, the time threshold value TKS is a fixed value regardless of the curvature radius R in a region at which the curvature radius R is larger than the predetermined radius R21. Therefore, the LDA limiting unit 173 sets the time threshold value TKS on the basis of the curvature radius R and then performs the determinations at the step S123 by using the set time threshold value TKS.

Again in FIG. 6, as a result of the determination at the step S123, if it is determined that the elapsed time is larger than the time threshold value TKS (the step S123: Yes), the LDA controlling unit 172 controls the brake actuator 13 to apply the braking force based on the pressure command value to at least one of the left rear wheel 121RL and the right rear wheel 121RR (a step S124). Then, the LDA limiting device 173 determines whether or not the rear slip ratio is larger than the second slip threshold value KSrr when the braking force is applied to at least one of the left rear wheel 121RL and the right rear wheel 121RR (the step S31). The process after the step S31 is same as the process in FIG. 2 (however, as described above, the counted elapsed time is reset at the step S32).

On the other hand, as a result of the determination at the step S123, if it is determined that the elapsed time is smaller than the time threshold value TKS (the step S123: No), the braking force based on the pressure command value is not yet applied to the left rear wheel 121RL and the right rear wheel 121RR. In this case, the ECU 17 terminates the lane departure prevention operation illustrated in FIG. 6. If the lane departure prevention operation illustrated in FIG. 6 is terminated due to the determination that the elapsed time is smaller than the time threshold value TKS, the ECU 17 may start the lane departure prevention operation illustrated in FIG. 6 again after the first predetermined period has elapsed.

Note that the braking force based on the pressure command value is not yet applied to the left rear wheel 121RL and the right rear wheel 121RR if the elapsed time is equal to the time threshold value TKS (the step S123: No), in an example illustrated in FIG. 6. However, the braking force based on the pressure command value may be applied to at least one of the left rear wheel 121RL and the right rear wheel 121RR if the elapsed time is equal to the time threshold value TKS.

Figure 8:
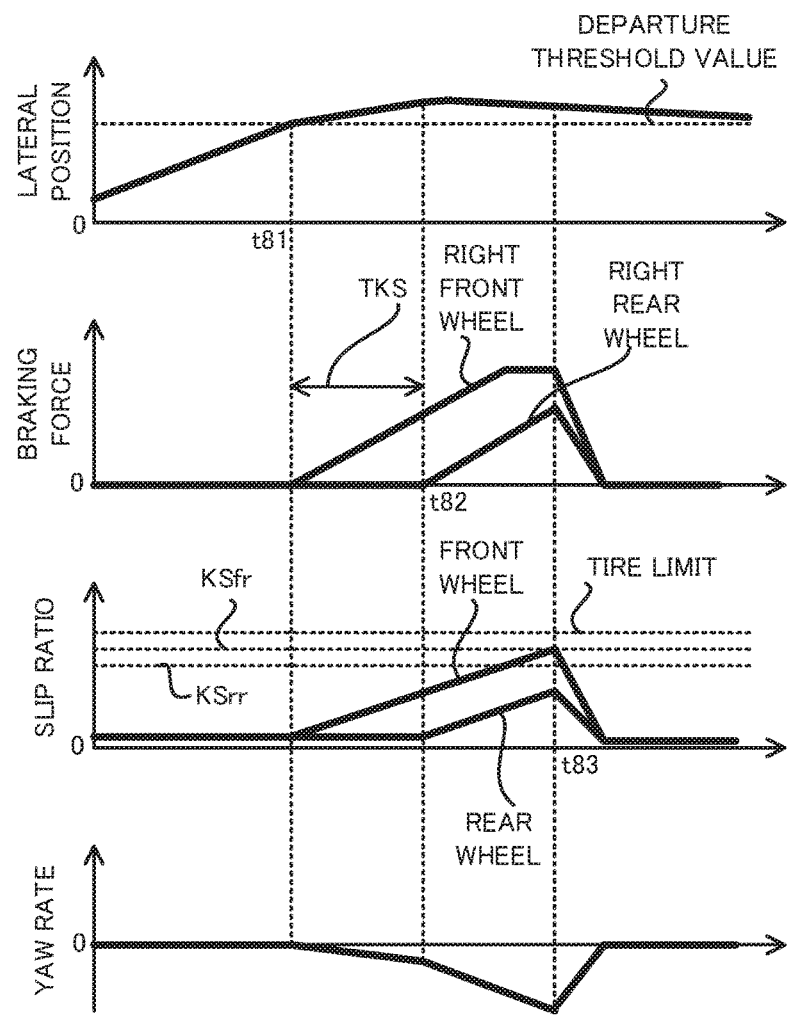
FIG. 8 is a timing chart illustrating a temporal transition of each of a future lateral position, a braking force, a rear slip ratio and yaw rate in the first modified example.

As described above, according to the first modified example of the lane departure prevention operation, the effect that is same as the effect achieved by the above described lane departure prevention operation can be achieved. In addition, in the first modified example, as illustrated in a timing chart in FIG. 8, the braking force starts to be applied to at least one of the left rear wheel 121RL and the right rear wheel 121RR after a time corresponding to the time threshold value TKS has elapsed since the braking force starts to be applied to at least one of the left front wheel 121FL and the right front wheel 121FR. In an example illustrated in FIG. 8, the braking force starts to be applied to the right front wheel 121FR at a time t81 and then the braking force starts to be applied to the right rear wheel 121RR at a time t82 at which the time corresponding to the time threshold value TKS has elapsed since the time t81. Thus, since the braking force starts to be applied to the left rear wheel 121RL and the right rear wheel 121RR after the braking force starts to be applied to the left front wheel 121FL and right front wheel 121FR, it is possible to effectively prevent the left rear wheel 121RL and the right rear wheel 121RR from skidding firstly before the left front wheel 121FL and the right front wheel 121FR skid. Note that the front slip ratio is larger than the first slip threshold value KSfr at a time t83, and as a result, the application of the prevention yaw moment is stopped at the time t83 in the example illustrated in FIG. 8.

Moreover, in the first modified example, the time threshold value TKS becomes larger as the curvature radius R is smaller. Here, each of the left front wheel 121FL, the left rear wheel 121RL, the right front wheel 121FR and the right rear wheel 121RR skids more easily as the curvature radius R is smaller, as described above. In the first modified example, considering this relationship between the curvature radius R and the slip ratio, the relatively large time threshold value TKS is used in the case where the curvature radius R is relatively small (namely, in the case where each of the left front wheel 121FL, the left rear wheel 121RL, the right front wheel 121FR and the right rear wheel 121RR skids relatively easily) so that the braking force is applied to the left rear wheel 121RL and the right rear wheel 121RR more later. Thus, it is possible to effectively prevent the left rear wheel 121RL and the right rear wheel 121RR from skidding firstly before the left front wheel 121FL and the right front wheel 121FR skid.

(4-2) Second Modified Example of Lane Departure Prevention Operation

Figure 9:
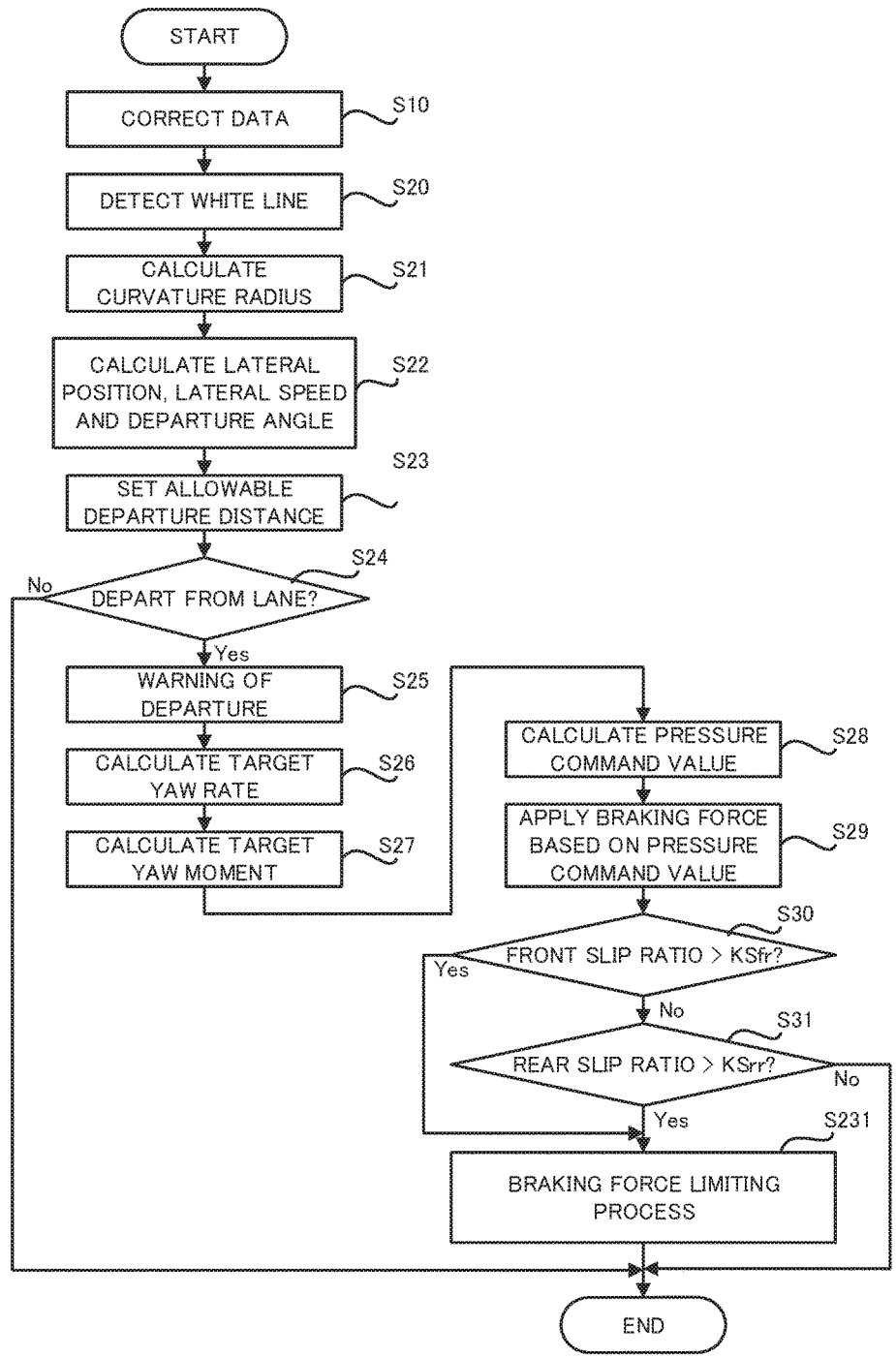
FIG. 9 is a flowchart that illustrates flow of a second modified example of a lane departure prevention operation.

With reference to FIG. 9, a second modified example of the lane departure prevention operation will be described. Note that a detailed description of a process that is same as the process in the above described lane departure prevention operation illustrated in FIG. 2 will be omitted by assigning same step number to the process.

In the lane departure prevention operation illustrated in FIG. 2, the LDA controlling unit 172 stops applying the prevention yaw moment, if it is determined that the front slip ratio is larger than the first slip threshold value KSfr and/or the rear slip ratio is larger than the second slip threshold value KSrr. On the other hand, in the second modified example of the lane departure prevention operation, the LDA controlling unit 172 performs a braking force limiting process for making the actually applied braking force be smaller than the braking force for applying the prevention yaw moment (namely, the desired braking force that should be applied to apply the prevention yaw moment), instead of stopping applying the prevention yaw moment, if it is determined that the front slip ratio is larger than the first slip threshold value KSfr and/or the rear slip ratio is larger than the second slip threshold value KSrr (a step S231). Thus, in the second modified example, the LDA controlling unit 172 continues to apply the braking force to the vehicle 1 while making the actually applied braking force be smaller than the desired braking force for applying the prevention yaw moment.

Figure 10:
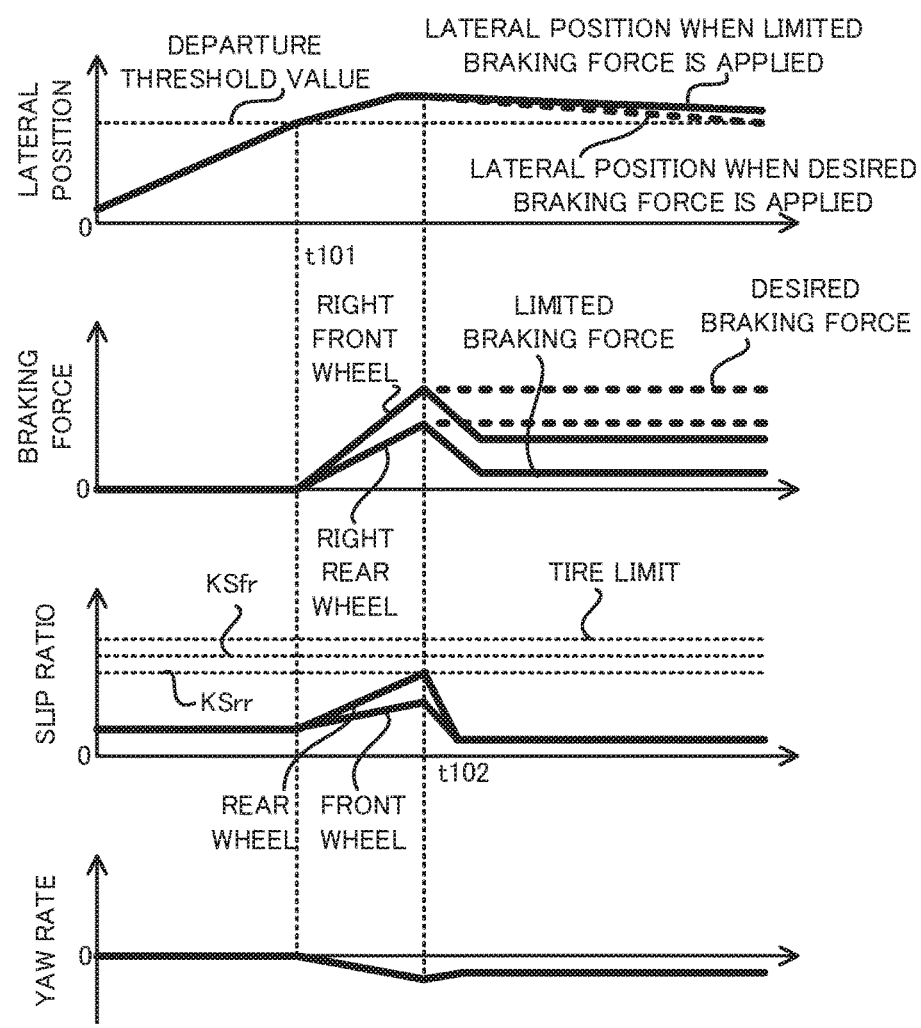
FIG. 10 is a timing chart illustrating a temporal transition of each of a future lateral position, a braking force, a rear slip ratio and yaw rate in the second modified example.

Specifically, for example, as illustrated in a timing chart in FIG. 10, an example in which the braking force starts to be applied to the right front wheel 121FR and the right rear wheel 121RR at a time t101 and then it is determined that the rear slip ratio is larger than the second slip threshold value KSrr at a time t102 will be described. In this case, the braking force that is smaller than the desired braking force (namely, the desired braking force that should be applied when the braking force limiting process is not performed) is applied to the right front wheel 121FR and the right rear wheel 121RR after the time t102. As a result, the prevention yaw moment that is applied after the time t102 is also smaller than the desired prevention yaw moment (namely, the desired prevention yaw moment that should be applied when the braking force limiting process is not performed). Thus, an adjusted amount of the lateral direction X of the vehicle 1 after the time t102 is smaller than a desired adjusted amount of the lateral direction X of the vehicle 1 that should be realized due to the desired prevention yaw moment being applied. However, even if the braking force limiting process is performed, the departure distance of the vehicle 1 from the driving lane becomes smaller, compared to the case where the prevention yaw moment is not applied at all.

After the braking force limiting process is performed, the ECU 17 terminates the lane departure prevention operation illustrated in FIG. 9. If the lane departure prevention operation illustrated in FIG. 9 is terminated while the braking force limiting process is performed, the ECU 17 starts the lane departure prevention operation illustrated in FIG. 9 again after the above described first predetermined period has elapsed. However, in the lane departure prevention operation restarted after the braking force limiting process is performed, the LDA controlling unit 172 controls the brake actuator 13 so that the actual applied braking force is smaller than the desired braking force based on the pressure command value that is newly calculated in the restarted lane departure prevention operation until the braking force limiting process is terminated. The braking force limiting process is terminated if it is determined that the first slip ratio is smaller than the first slip threshold value KSfr and the second slip ratio is smaller than the second slip threshold value KSrr.

The braking force limiting process may be a process for adjusting a pressure gain. The pressure gain is a parameter that is used to adjust magnitude of the braking force based on the pressure command value. The LDA controlling unit 172 calculates new pressure command value by multiplying the previous pressure command value calculated on the basis of the target yaw moment $M_{tgt}$ and the pressure gain, and controls the brake actuator 13 to apply the braking force based on the new pressure command value. In this case, the LDA controlling unit 172 may use a default pressure gain if it is determined that the first slip ratio is smaller than the first slip threshold value KSfr and the second slip ratio is smaller than the second slip threshold value KSrr. On the other hand, the LDA controlling unit 172 may use a pressure gain that is smaller than the default pressure gain if it is determined that the first slip ratio is larger than the first slip threshold value KSfr and/or the second slip ratio is larger than the second slip threshold value KSrr.

As described above, according to the second modified example of the lane departure prevention operation, the effect that is same as the effect achieved by the above described lane departure prevention operation can be achieved. In addition, in the second modified example, the departure of the vehicle 1 from the driving lane is prevented more effectively, because the braking force that is smaller than the desired braking force for applying the prevention yaw moment continues to be applied instead of stopping applying the braking force.

Figure 11A:
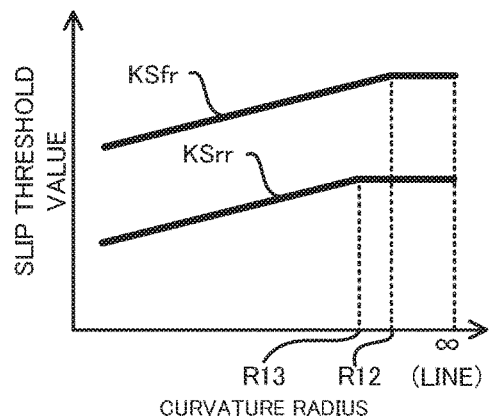

(4-3) Another Modified Example of Lane Departure Prevention Operation (4-3-1) Modified Example of First Slip Threshold Value KSfr and Second Slip Threshold Value KSrr As illustrated in FIG. 11(a), the LDA limiting unit 173 may set the first slip threshold value KSfr and the second slip threshold value KSrr so that the curvature radius R (a predetermined radius R12) that represents a border between a region in which the first slip threshold value KSfr varies depending on the curvature radius R and a region in which the first slip threshold value KSfr is a fixed value regardless of the curvature radius R is different from the curvature radius R (a predetermined radius R13) that represents a border between a region in which the second slip threshold value KSrr varies depending on the curvature radius R and a region in which the second slip threshold value KSrr is a fixed value regardless of the curvature radius R. In this case, the LDA limiting unit 173 may set the predetermined radius R12 to be smaller than or larger than the predetermined radius R13.

Figure 11B:
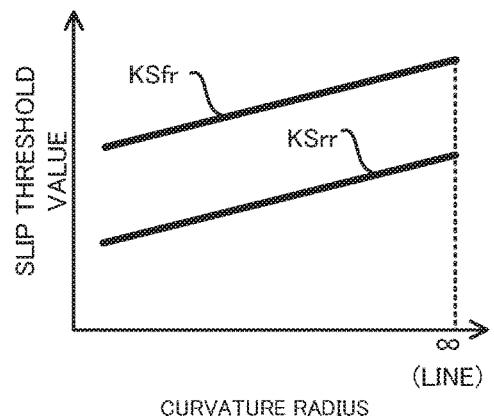

As illustrated in FIG. 11(b), the LDA limiting unit 173 may set the first slip threshold value KSfr and the second slip threshold value KSrr so that each of the first slip threshold value KSfr and the second slip threshold value KSrr becomes smaller as the curvature radius R becomes smaller even in any curvature radius R.

Figure 11C:
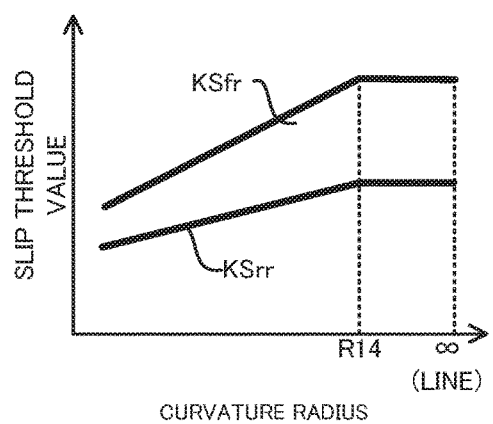

As illustrated in FIG. 11(c), the LDA limiting unit 173 may set the first slip threshold value KSfr and the second slip threshold value KSrr so that a variation rate (in other words, a change rate, a slope) of the first threshold value KSfr with respect to the curvature radius R is different from a variation rate (in other words, a change rate, a slope) of the second threshold value KSrr with respect to the curvature radius R. In this case, the LDA limiting unit 173 may set the variation rate of the first threshold value KSfr with respect to the curvature radius R to be smaller than or larger than the variation rate of the second threshold value KSrr with respect to the curvature radius R.

Figure 11D:
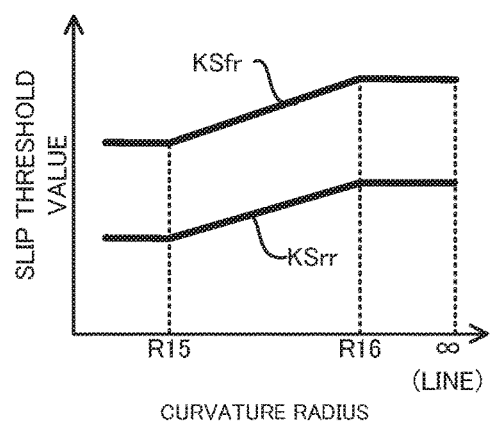

As illustrated in FIG. 11(d), the LDA limiting unit 173 may set the first slip threshold value KSfr and the second slip threshold value KSrr so that each of the first slip threshold value KSfr and the second slip threshold value KSrr becomes smaller as the curvature radius R becomes smaller in a region at which the curvature radius R is smaller than a predetermined radius R16 and larger than a predetermined radius R15 (note that R15<R16). The LDA limiting unit 173 may set the first slip threshold value KSfr and the second slip threshold value KSrr so that each of the first slip threshold value KSfr and the second slip threshold value KSrr is a fixed value regardless of the curvature radius R in a region at which the curvature radius R is larger than the predetermined radius R16 or smaller than the predetermined radius R15.

Figure 11E:
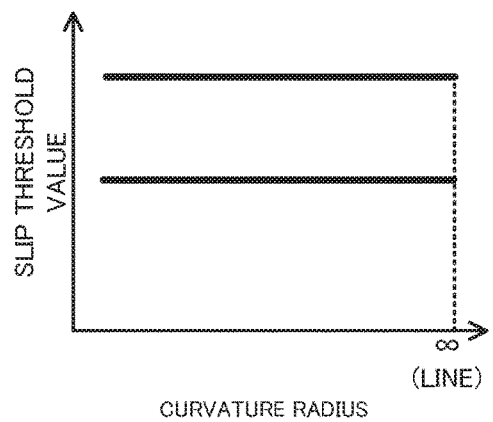

As illustrated in FIG. 11(e), the LDA limiting unit 173 may set the first slip threshold value KSfr and the second slip threshold value KSrr so that each of the first slip threshold value KSfr and the second slip threshold value KSrr is a fixed value regardless of the curvature radius R. The LDA limiting unit 173 may set the first slip threshold value KSfr and the second slip threshold value KSrr so that the first slip threshold value KSfr is a fixed value regardless of the curvature radius R and the second slip threshold value KSrr varies depending on the curvature radius R, although its example is not illustrated in the drawings. The LDA limiting unit 173 may set the first slip threshold value KSfr and the second slip threshold value KSrr so that the second slip threshold value KSrr is a fixed value regardless of the curvature radius R and the first slip threshold value KSfr varies depending on the curvature radius R, although its example is not illustrated in the drawings.

(4-3-2) Modified Example of Time Threshold Value TKS

As illustrated in FIG. 12(a), the LDA limiting unit 173 may set the time threshold value TKS so that time threshold value TKS becomes larger as the curvature radius R becomes smaller even in any curvature radius R. As illustrated in FIG. 12(b), the LDA limiting unit 173 may set the time threshold value TKS so that the time threshold value TKS becomes smaller as the curvature radius R becomes larger in a region at which the curvature radius R is smaller than a predetermined radius R23 and larger than a predetermined radius R22 (note that R22<R23). The LDA limiting unit 173 may set time threshold value TKS so that the time threshold value TKS is a fixed value in a region at which the curvature radius R is larger than the predetermined radius R23 or smaller than the predetermined radius R22. As illustrated in FIG. 12(c), the LDA limiting unit 173 may set time threshold value TKS so that the time threshold value TKS is a fixed value regardless of the curvature radius R.

At least one portion of the feature in the above described embodiment and the modified examples may be eliminated or modified accordingly. At least one portion of the feature in the above described embodiment and the modified example may be combined with at least another one portion of the feature in the above described embodiment and the modified example.

This application is based upon and claims the benefit of priority of the prior Japanese Patent Application No. 2016-159254, filed on Aug. 15, 2016, the entire contents of which are incorporated herein by reference. In addition, the entire contents of the above described Patent Literatures 1 to 3 is incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. A lane departure prevention apparatus, which involve such changes, are also intended to be within the technical scope of the present invention.

REFERENCE SIGNS LIST 1 vehicle
17 ECU
172 LDA controlling unit
173 LDA limiting unit

The invention claimed is:

1. A lane departure prevention apparatus comprising a controller,
    wherein the controller is programmed to:
    determine whether there is a possibility that a vehicle will depart from a driving lane on which the vehicle is currently traveling;
    based upon a determination that there is a possibility that the vehicle will depart from the driving lane, calculate a prevention yaw moment that prevents the vehicle from departing from the driving lane on which the vehicle is currently traveling and control a brake that applies a braking force to wheels so that the calculated prevention yaw moment is applied to the vehicle; and
    based upon the calculated prevention yaw moment being applied to the vehicle, determine whether or not a slip ratio of a front wheel among the wheels is larger than a first threshold value and whether or not a slip ratio of a rear wheel among the wheels is larger than a second threshold value that is smaller than the first threshold value; and
    control the brake so that the braking force applied from the brake becomes smaller than the braking force that applies the calculated prevention yaw moment, based upon a determination that the slip ratio of the front wheel is larger than the first threshold value and/or the slip ratio of the rear wheel is larger than the second threshold value.

2. The lane departure prevention apparatus according to claim 1, wherein
    the controller is further programmed to set at least one of the first and second threshold values to be smaller as a curvature radius of the driving lane becomes smaller.

3. The lane departure prevention apparatus according to claim 1, wherein
    the controller is further programmed to stop applying the braking force from the brake based upon a determination that the slip ratio of the front wheel is larger than the first threshold value and/or the slip ratio of the rear wheel is larger than the second threshold value.

4. The lane departure prevention apparatus according to claim 1, wherein
    the controller is further programmed to control the brake to start applying the braking force to the rear wheel after a predetermined time has elapsed since the braking force starts to be applied to the front wheel.

5. The lane departure prevention apparatus according to claim 4, wherein
    the controller is further programmed to set the predetermined time to be longer as a curvature radius of the driving lane becomes smaller.

* * * * *